(12) United States Patent
Nakamura et al.

(10) Patent No.: US 9,317,620 B2
(45) Date of Patent: Apr. 19, 2016

(54) SERVER DEVICE

(75) Inventors: Tomoki Nakamura, Nagoya (JP); Fumitoshi Uno, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 1547 days.

(21) Appl. No.: 12/181,888

(22) Filed: Jul. 29, 2008

(65) Prior Publication Data

US 2009/0037433 A1 Feb. 5, 2009

(30) Foreign Application Priority Data

Jul. 31, 2007 (JP) ................................ 2007-200177

(51) Int. Cl.
G06F 17/30 (2006.01)
H04L 29/08 (2006.01)

(52) U.S. Cl.
CPC .......... *G06F 17/30887* (2013.01); *H04L 67/06* (2013.01)

(58) Field of Classification Search
CPC .......................... G06F 17/30887; H04L 67/06
See application file for complete search history.

(56) References Cited

U.S. PATENT DOCUMENTS 5,848,410 A * 12/1998 Walls et al.
6,424,385 B1 * 7/2002 Koyama et al. ............... 348/734
6,697,795 B2 * 2/2004 Holcomb
6,782,402 B1 * 8/2004 Hidaka et al.
7,797,283 B2 * 9/2010 Fachan et al. ................. 707/655
2003/0220914 A1 * 11/2003 De Angelis et al. .............. 707/3
2004/0083241 A1 * 4/2004 Mifune .......................... 707/200
2004/0181598 A1 * 9/2004 Paya et al. ..................... 709/227
2005/0177595 A1 * 8/2005 Krieg et al. ................. 707/104.1
2005/0210414 A1 * 9/2005 Angiulo et al. ............... 715/838
2006/0059198 A1 * 3/2006 Uchida et al. .............. 707/104.1
2007/0250544 A1 * 10/2007 Shibata et al. ................ 707/200
2008/0016090 A1 * 1/2008 Fukata .......................... 707/100

FOREIGN PATENT DOCUMENTS

JP H08-036512 A 2/1996
JP 2003-085074 * 3/2003

(Continued)

OTHER PUBLICATIONS

Japan Patent Office, Office Action for Japanese Patent Application No. 2007-200177 (counterpart to above-captioned patent application), mailed Aug. 4, 2009.

(Continued)

*Primary Examiner* — Shew-Fen Lin
(74) *Attorney, Agent, or Firm* — Merchant & Gould P.C.

(57) ABSTRACT

The server device includes an index file generating unit, and a transferring unit. The index file generating unit generates an index file with respect to a prescribed directory in a hypertext format. The prescribed directory is a part of the hierarchy structure. The index file includes a list of identification information that identifies a file or a first subdirectory in the prescribed directory, and location information navigating to the file or the first subdirectory. The transferring unit transfers the index file to the client device in response to the command received at the receiving unit instructing to transfer the index file, whereas the transferring unit transfers the file stored in the storing unit in response to the command received at the receiving unit instructing to transfer the file other than the index file.

11 Claims, 13 Drawing Sheets

(56) References Cited

FOREIGN PATENT DOCUMENTS

| JP | 2003-085074 A | 3/2003 |
|----|---------------|--------|
| JP | 2006-173818 A | 6/2006 |

OTHER PUBLICATIONS

Taniguchi, Kieji, "Fourth Installment, Method for Constructing Web Server Customizing Apache httpd 2," UNIX USER, Dec. 1, 1997, vol. 6, pp. 97-106, Softbank Kabushiki Kaisha. (Concise explanation/partial translation also enclosed).

Field, Duane K., et al., "Web Development with JavaServer Pages New contents devoloping method by using the servlet architecture," Mar. 30, 2001, 1st ed., Kabushiki Kaisha Shoueisha. (Concise explanation/partial translation also enclosed).

"An HTTPD Guest Book/Commnet Collection (Feb. 14, 2000, 18:17)," available at http://web.archive.org/web/20010212095632/http://homepage1.nifty.com/yito/namazu/gbook/20000214.1817.html (searched on Jul. 2, 2009). (Concise explanation/partial translation also enclosed).

Tanaka, Motoyuki, et al., "CGI progarmming in 1998," Macintosh Developer's JOURNAL, Apr. 15, 1998, No. 30, pp. 34-48, Kabushiki Kaisha Gijutsuhyoronnsha. (Concise explanation/partial translation also enclosed).

Kubo, Nozomi, "Folder Size' Software that can display folder size in explorer," Madonomori, Mar. 31, 2005, Kabushiki Kaisha Impress Watch, available at http://www.forest.impress.co.jp/article/2005/03/31/foldersize.html (searched on Jul. 27, 2009). (Concise explanation/partial translation also enclosed).

* cited by examiner

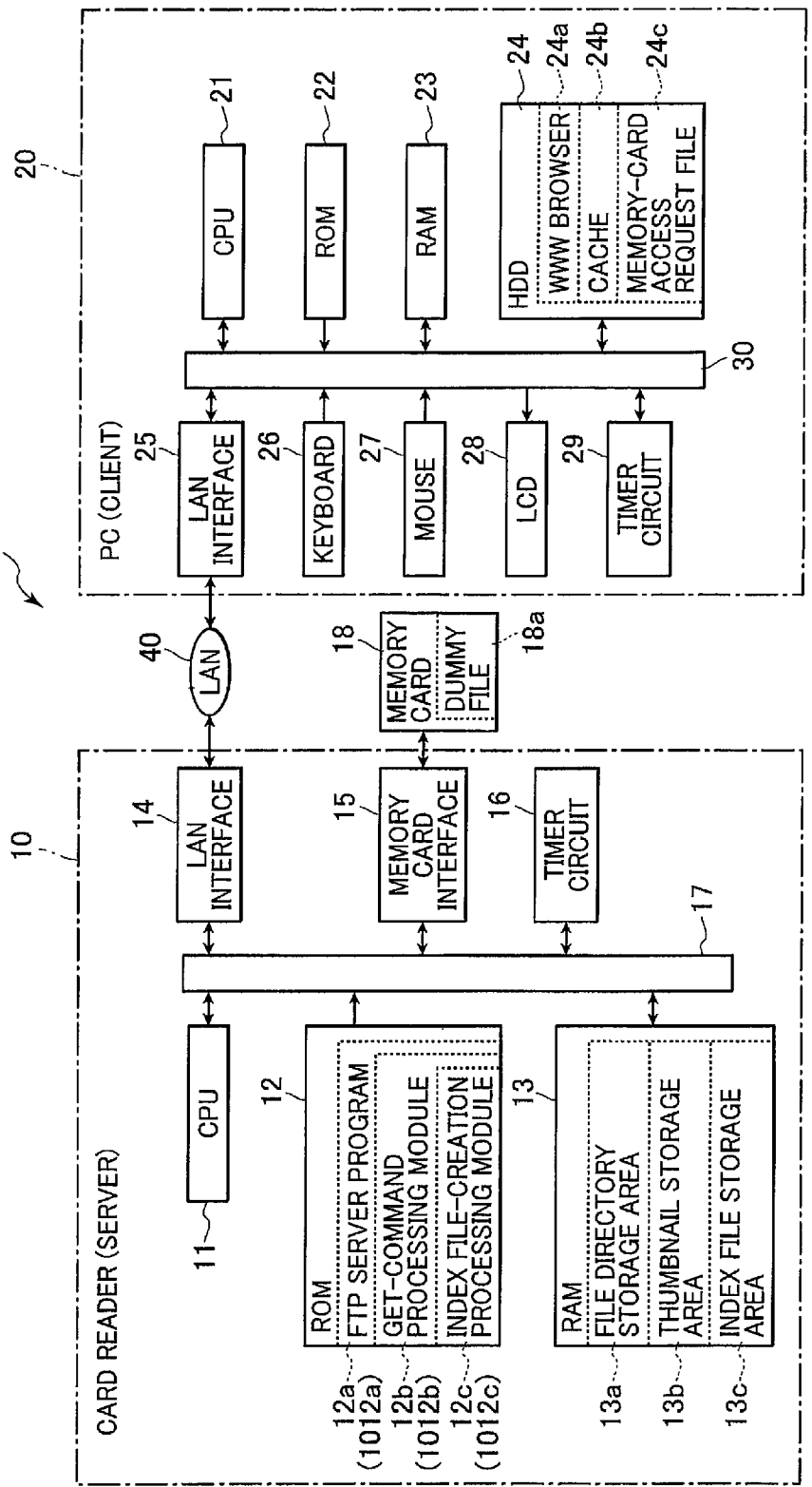

DUMMY FILE "Photo_dummy.html" CREATED FOR SUBDIRECTORY "Photo"

```
<HTML>
<HEAD>
<META HTTP-EQUIV="Refresh" CONTENT=" 0;url=Photo/_index.html ">
<TITLE></TITLE>
</HEAD>
</HTML>
```

DUMMY FILE "temp_txt_dummy.html" CREATED FOR FILE "temp.txt"

```
<HTML>
<HEAD>
<META HTTP-EQUIV="Refresh" CONTENT=" 0;url=temp.txt ">
<TITLE></TITLE>
</HEAD>
</HTML>
```

MEMORY-CARD ACCESS REQUEST FILE "dummy.html"

```
<HTML>
<HEAD>
<META HTTP-EQUIV="Refresh" CONTENT="0;url= ftp://aaa/_ingex.html">
<TITLE></TITLE>
</HEAD>
</HTML>
```

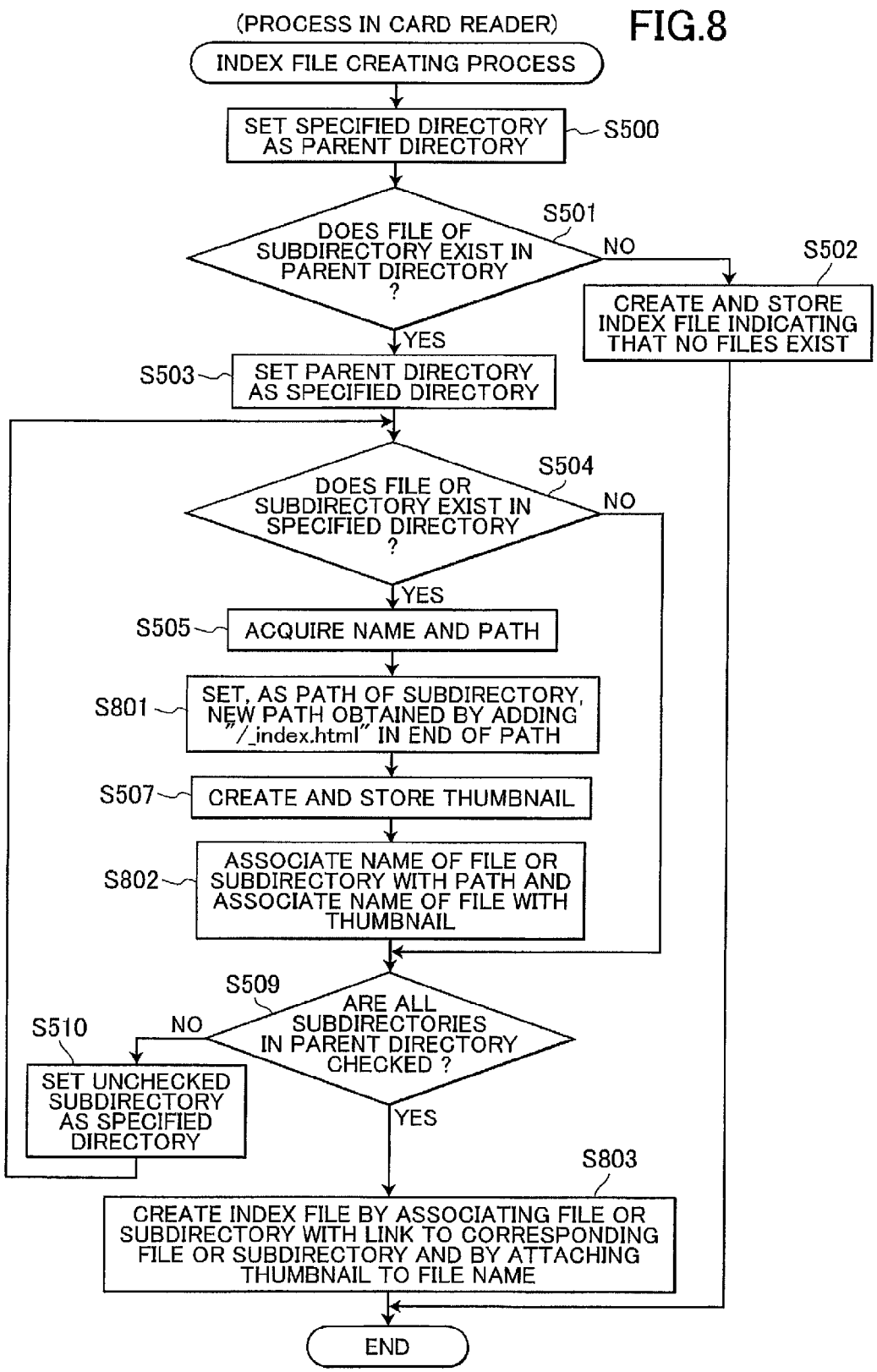

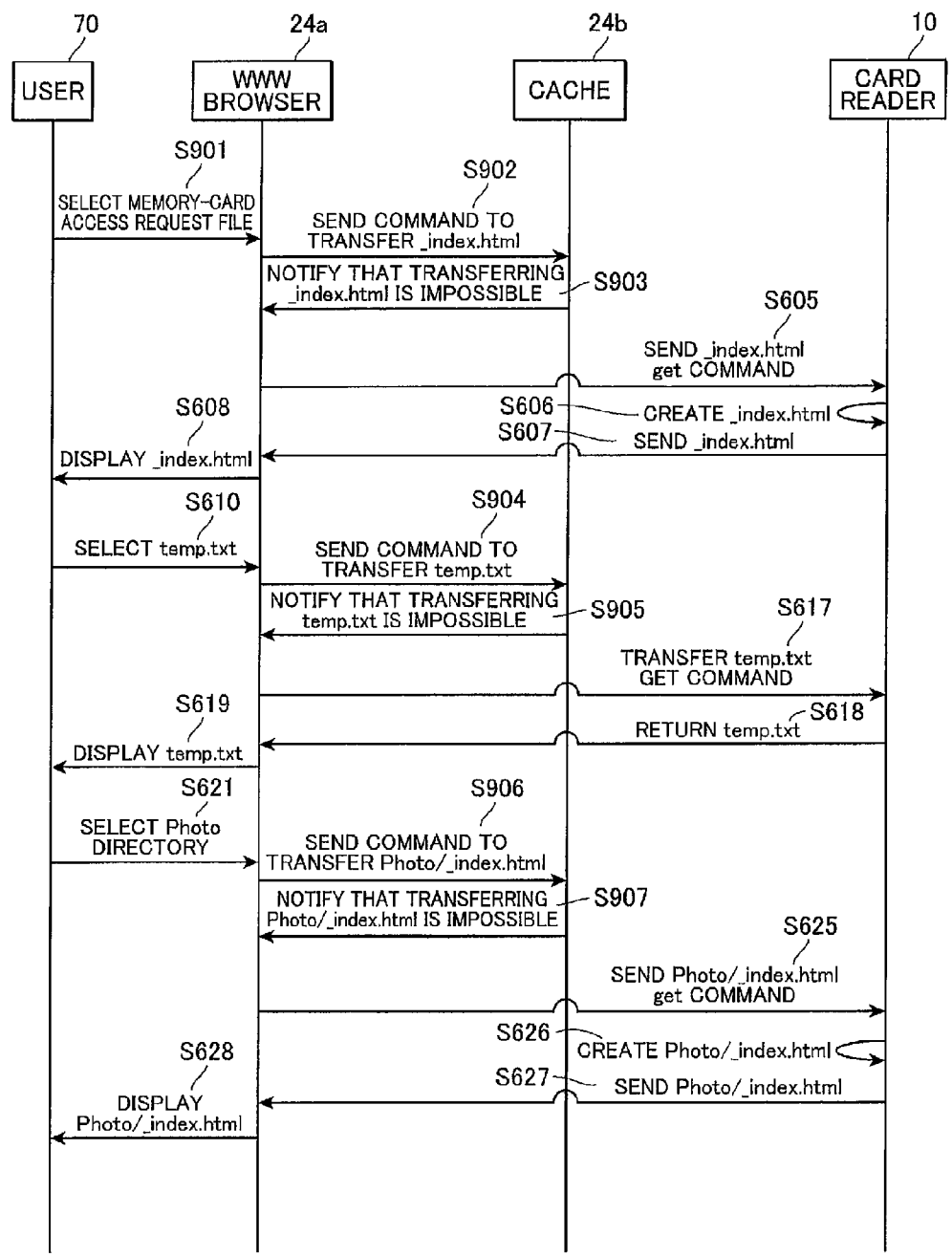

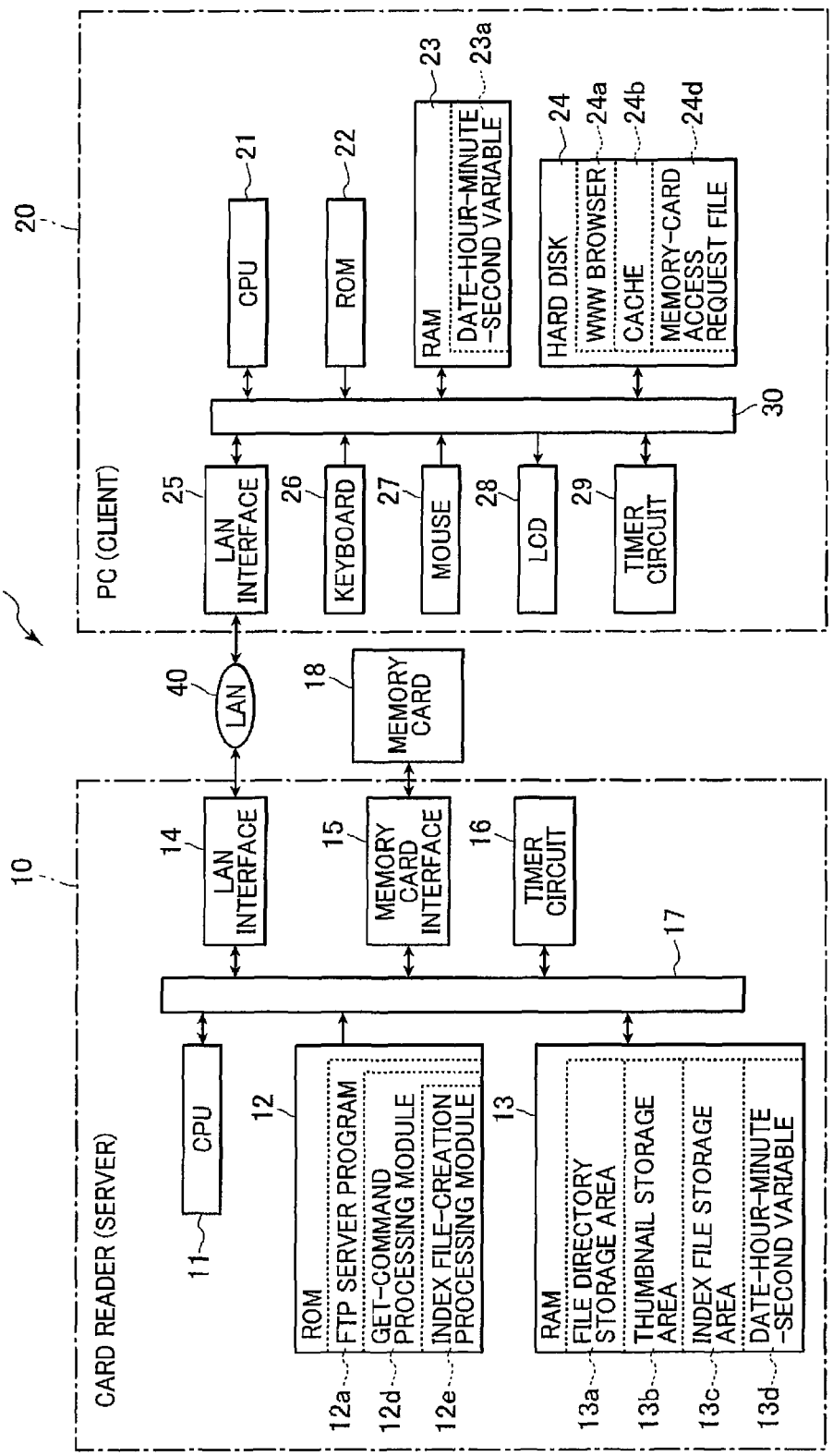

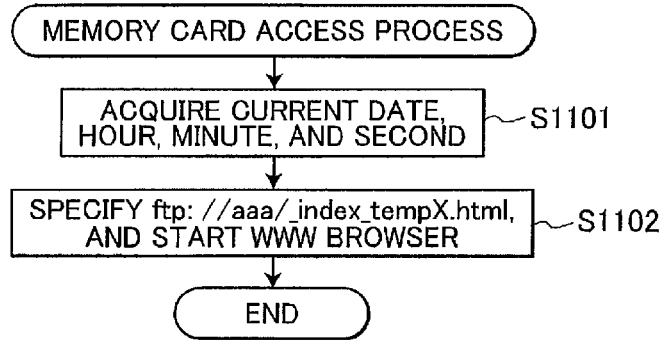
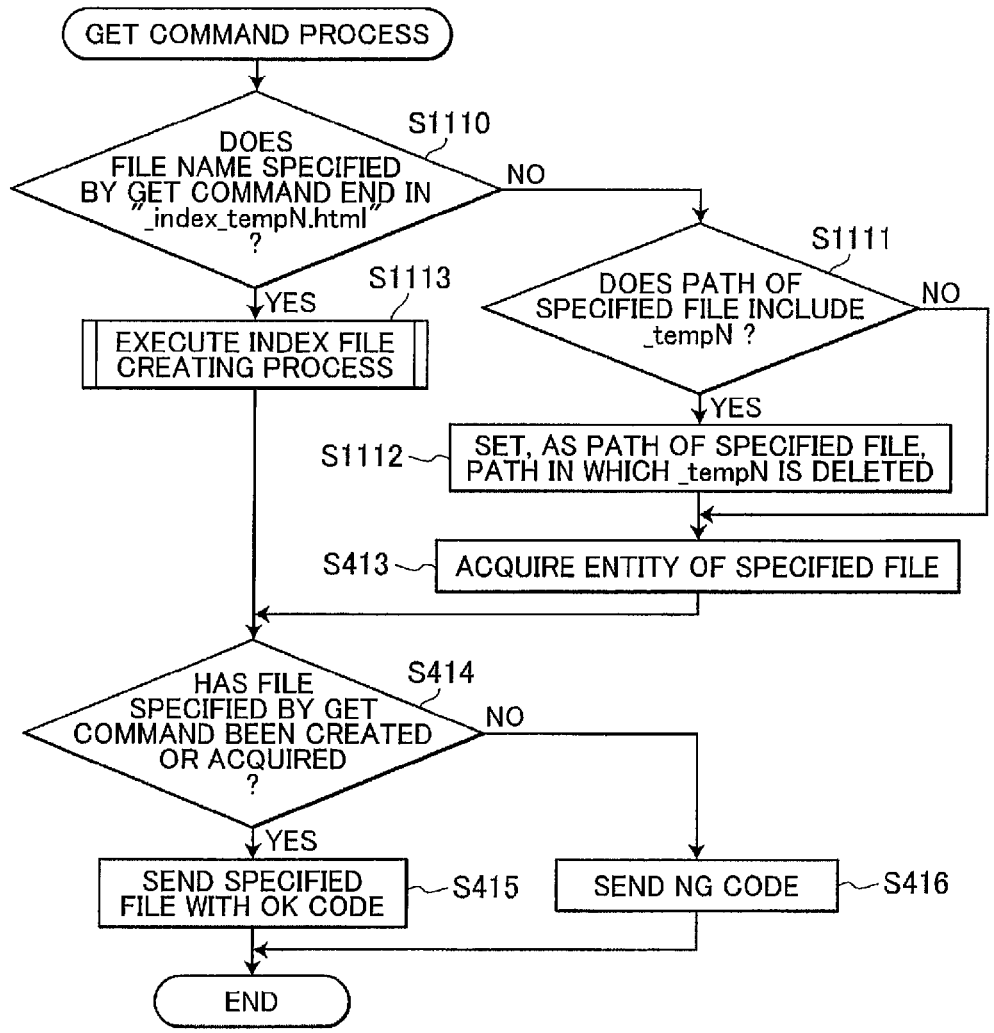

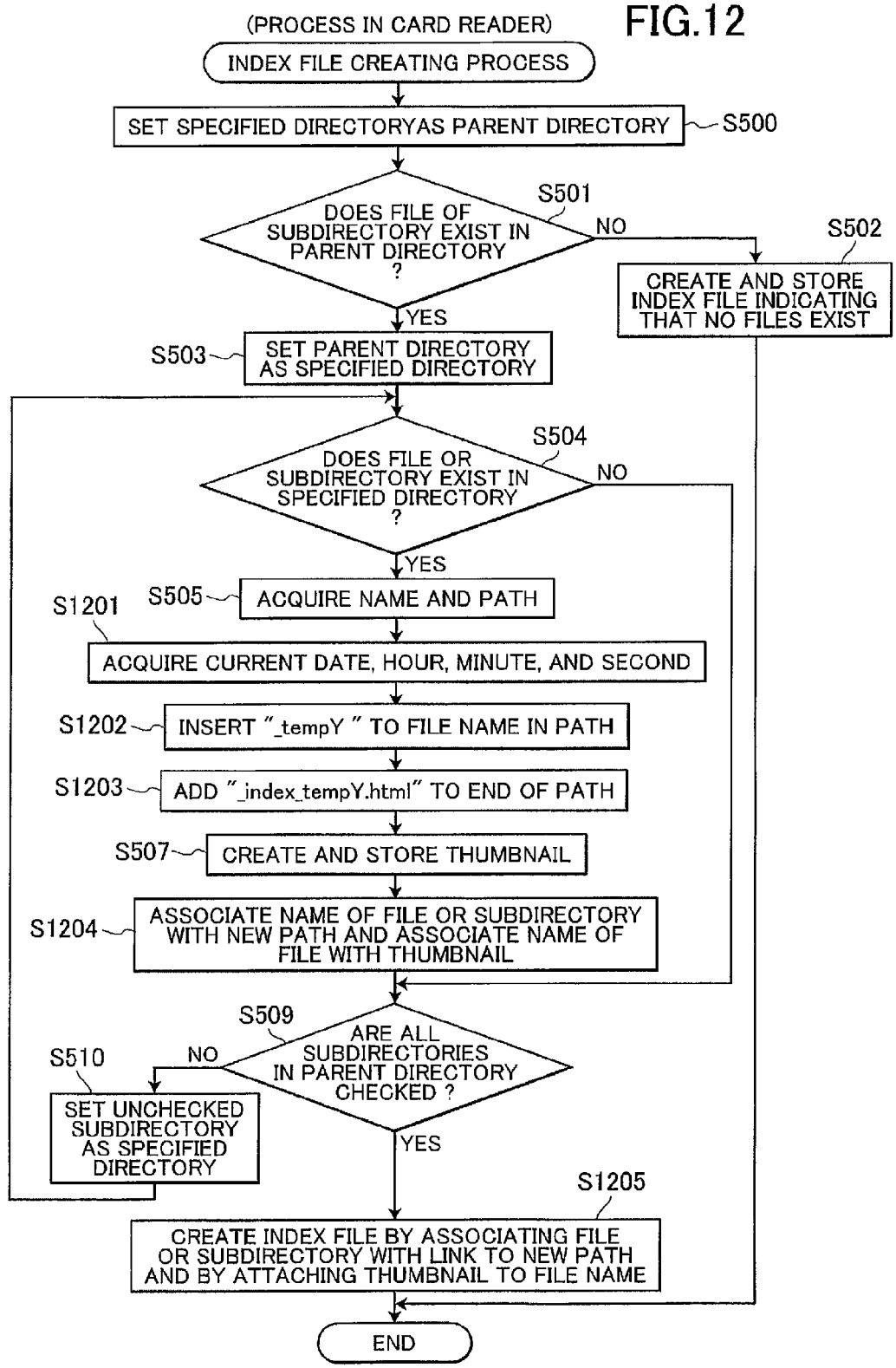

SERVER DEVICE

CROSS REFERENCE TO RELATED APPLICATION

This application claims priority from Japanese Patent Application No. 2007-200177 filed Jul. 31, 2007. The entire content of the priority application is incorporated herein by reference.

TECHNICAL FIELD

The present invention relates to a server device, a server device control method, and a file transfer system.

BACKGROUND

There has been known a communication protocol which allows data transfer through a network, such as, FTP (File Transfer Protocol) and HTTP (Hypertext Transfer Protocol). Further, there have been known various systems available for transmitting and receiving data via FTP or HTTP.

Japanese Patent Application Publication No. 2003-85074 discloses a system which transfers files stored on a WWW (World Wide Web) server to a user terminal so that the files are displayed on a WWW browser of the user terminal. In this system, the WWW browser presents, to a user, the links to access the files stored on the WWW server. When the user selects one of the links presented on the WWW browser, the file corresponding to the selected link is transferred from the WWW server to the user terminal.

SUMMARY

However, in the above described system, when one of the files stored on the WWW server is deleted, or when a new file is added thereon, the file links presented on the WWW browser are not updated. When the user selects one of the file links presented on the WWW browser, the user sometimes finds that the file corresponding to the selected link does not exist. The user also finds that the selected link is not presented on the WWW browser. Furthermore, the WWW browser does not always present the links to all the files stored on the WWW server. This means that the user cannot access correctly a file stored on the WWW server.

In view of the foregoing, it is an object of the present invention to provide a server device and a file transfer system, both of which allow a user to access each file stored in a server device correctly via a client device.

In order to attain the above and other objects, the invention provides a server device capable of communicating with a client device via a network. The server device includes a storing unit, a receiving unit, an index file generating unit, and a transferring unit. The storing unit stores a file in a directory that constructs a hierarchy structure. The receiving unit receives a command from the client device. The index file generating unit generates an index file with respect to a prescribed directory in a hypertext format. The prescribed directory is a part of the hierarchy structure. The index file includes a list of identification information that identifies a file or a first subdirectory in the prescribed directory, and location information navigating to the file or the first subdirectory. The transferring unit transfers the index file to the client device in response to the command received at the receiving unit instructing to transfer the index file, whereas the transferring unit transfers the file stored in the storing unit in response to the command received at the receiving unit instructing to transfer the file other than the index file.

According to another aspects, the invention provides a file transfer system. The file transfer system includes a server device and a client device. The server device is capable of communicating with the client device via a network. The server device includes a storing unit, a receiving unit, an index file generating unit, and a transferring unit. The storing unit stores a file in a directory that constructs a hierarchy structure. The receiving unit receives a first command and a second command from the client device. The index file generating unit generates an index file with respect to a prescribed directory in a hypertext format. The prescribed directory is a part of the hierarchy structure. The index file includes a list of identification information that identifies a file or a first subdirectory in the prescribed directory, and location information navigating to the file or the first subdirectory. The transferring unit transfers the index file to the client device in response to the first command received at the receiving unit instructing to transfer the index file, whereas the transferring unit transfers the file stored in the storing unit in response to the second command received at the receiving unit instructing to transfer the file other than the index file. The client device includes a browser, a first command transferring unit, and a second command transferring unit. The browser is capable of displaying a file generated in a hypertext format and accessing a file stored in the server device via the location information in the file generated in the hypertext format. The first command transferring unit transfers a first command to transfer the index file. The second command transferring unit transfers a second command to transfer the file that is other than the index file and specified by the browser.

According to still another aspects, the invention provides a method for controlling a server device that is capable of communicating with a client device via a network. The server device stores a file in a directory that constructs a hierarchy structure. The method includes (a) receiving a command from the client device, (b) generating an index file with respect to a prescribed directory in a hypertext format, wherein the prescribed directory is a part of the hierarchy structure, wherein the index file includes a list of identification information that identifies a file or a first subdirectory in the prescribed directory, and location information navigating to the file or the first subdirectory, (c) transferring the index file to the client device in response to the command received at the receiving step (a) instructing to transfer the index file, and (d) transferring the file stored in the server device in response to the command received at the receiving step (a) instructing to transfer the file other than the index file.

According to still another aspects, the invention provides a computer-readable storage medium storing a set of program instructions executable on a server device that is capable of communicating with a client device via a network. The server device stores a file in a directory that constructs a hierarchy structure. The program instructions includes (a) receiving a command from the client device, (b) generating an index file with respect to a prescribed directory in a hypertext format wherein the prescribed directory being a part of the hierarchy structure, wherein the index file includes a list of identification information that identifies a file or a first subdirectory in the prescribed directory, and location information navigating to the file or the first subdirectory, (c) transferring the index file to the client device in response to the command received at the receiving step (a) instructing to transfer the index file, and (d) transferring the file stored in the server device in response to the command received at the receiving step (a) instructing to transfer the file other than the index file.

BRIEF DESCRIPTION OF THE DRAWINGS

Embodiments in accordance with the invention will be described in detail with reference to the following figures wherein:

FIG. 1 is a block diagram showing an electrical configuration of a file transfer system according to a first embodiment of the invention;

FIG. 8 is a flowchart showing an index file creating process that is performed while executing an index file-creation processing module according to the second embodiment;

FIG. 9 is a sequence chart showing an operational sequence of the file transfer system according to the second embodiment;

FIG. 10 is a block diagram showing an electrical configuration of a file transfer system according to a third embodiment;

FIG. 11(a) is a flowchart showing a memory card access process according to a third embodiment that is performed when a memory-card access request file is clicked;

FIG. 11(b) is a flowchart showing a get command process that is performed while executing a get-command processing module according to the third embodiment;

FIG. 12 is a flowchart showing an index file creating process that is performed while executing an index file-creation processing module according to the third embodiment.

DETAILED DESCRIPTION

First Embodiment

Figures 2A, 2B, 2C:
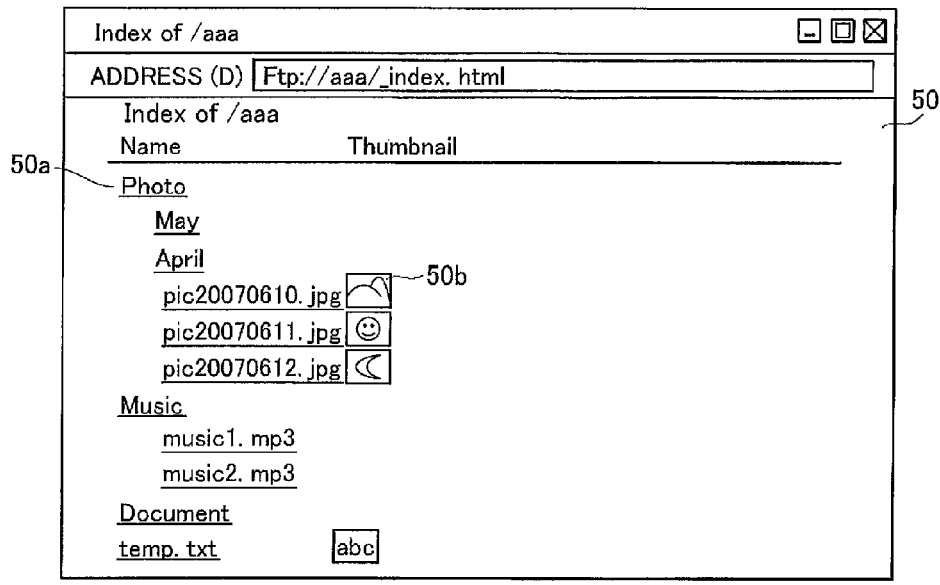
FIG. 2(a) shows an index file displayed on a screen of a liquid crystal display (LCD) unit by a WWW browser of a PC.
FIG. 2(b) shows a content of a dummy file "Photo_dummy.html" created for a subdirectory "Photo"
FIG. 2(c) shows a content of a dummy file "temp_txt_dummy.html" created for a file "temp.txt"

Next, an embodiment of the invention will be described while referring to the accompanying drawings. FIG. 1 is a block diagram showing an electrical configuration of a file transfer system 1 according to a first embodiment of the invention.

The file transfer system 1 includes a card reader 10 which works as a server device; and a personal computer (PC) 20 which works as a client device. The card reader 10 and the PC 20 are connected to each other through a LAN (Local Area Network) 40. The file transfer system 1 allows the PC 20 to access a file stored in a memory card 18 mounted to a card reader 10.

In the file transfer system 1, the card reader 10 creates an index file for a prescribed directory in the memory card 18, and then provides the created index file to the PC 20. The index file for the prescribed directory is a hypertext-format file listing the files and subdirectories existing in the prescribed directory. The index file lists names of the files and the subdirectories. In the index file, each file name is correlated to a link to the entity of the file corresponding to the file name. Further, in the index file, each subdirectory name is correlated to the entity of the subdirectory corresponding to the subdirectory name. The card reader 10 creates an index file for the prescribed directory every time the PC 20 requests the card reader 10 to transfer the index file for the prescribed directory.

The card reader 10 is a server device capable of reading each file stored in the memory card 18. The card reader 10 includes a card slot (not shown). The memory card 18 is detachably mounted to the card reader 10. As a user mounts the memory card 18 to the card slot (not shown), the card reader 10 can access to the memory card 18. The card reader 10 communicates with the PC 20 via FTP (File Transfer Protocol) to transfer each file stored in the memory card 18 to the PC 20 through a LAN 40. A file stored in the memory card 18 according to a directory. A plurality of directories in the memory card 18 constructs hierarchy structure having a plurality of levels.

The card reader 10 includes a CPU (Central Processing Unit) 11, a ROM (Read Only Memory) 12, a RAM (Random Access Memory) 13, a LAN interface 14, a memory card interface 15, and a timer circuit 16 which are connected to one another through a bus line 17. The card reader 10 is connected to the memory card 18 through the memory card interface 15.

The CPU 11 is an arithmetic unit for controlling the devices (the ROM 12, the RAM 13, the LAN interface 14, the memory card interface 15, and the timer circuit 16) connected through the bus line 17, according to programs or data stored in the ROM 12 or the RAM 13 or according to various signals communicated through the LAN interface 14.

The ROM 12 is an unwritable memory which stores various programs to be executed by the CPU 11, and fixed values to be referred to when the programs are executed. The ROM 12 also stores an FTP server program 12a as a control program; a get-command processing module 12b that works with the FTP server program 12a; and an index file-creation processing module 12c that works with the get-command processing module 12b.

The FTP server program 12a controls the card reader 10 to communicate with the PC 20 via FTP. When the user starts the card reader 10, the FTP server program 12a is started by the CPU 11. When a FTP command is inputted from the PC 20, the FTP server program 12a performs processing in accordance with the inputted command. If a "get" command is inputted during executing the FTP server program 12a, the FTP server program 12a starts the get-command processing module 12b to perform processing in accordance with the "get" command. The FTP server program 12a keeps running until the card reader 10 stops.

The get-command processing module 12b is a program which controls the CPU 11 to perform processing in response to the FTP "get" command. The get-command processing module 12b works with the FTP server program 12a. The "get" command requests the card reader 10 to transfer a file specified by the PC 20.

As the get-command processing module 12b is executed, the CPU 11 transfers the file specified by the "get" command to the PC 20. If the file specified by the "get" command is an index file, the CPU 11 starts the index file-creation processing module 12*c* to create the index file and to transfer the created index file to the PC 20. If the file specified by the "get" command is not found, or if no index file is created, the CPU 11 returns an "NG" code to the PC 20. The "NG" code indicates that an error is occurred. After transferring the file or returning the "NG" code, the CPU 11 finishes the execution of the get-command processing module 12*b*.

When the PC 20 sends a "get" command to specify the index file that exists (or, practically, is treated as existing) in a prescribed directory stored in the memory card 18, the card reader 10 creates the index file for the prescribed directory by the index file-creation processing module 12*c*, and then sends, as a reply, the created index file to the PC 20. Accordingly, the user of the PC 20 can handle the entity of the index file which does not exist in the memory card 18 at the time when the "get" command is sent.

The index file-creation processing module 12*c* is a program which controls the CPU 11 to create an index file. The index file-creation processing module 12*c* works with the get command processing module 12*b*.

With reference to FIG. 2(*a*), an index file is explained in detail. FIG. 2(*a*) shows an index file 50 displayed on a screen of a liquid crystal display (LCD) unit 28 by a WWW browser 24*a* of the PC 20. The index file 50 has been created by specifying a root directory as a prescribed directory. The root directory is the top-most directory among the directories in the memory card 18. The entity of the file is described in HTML (Hypertext Markup Language).

The index file 50 contains a character string "Index of/aaa" indicating that the currently displayed index file 50 is an index file created for the root directory ("aaa") in the memory card 18.

The index file 50 lists the names 50*a* of all the subdirectories existing in the root directory including "Photo", "Music", and "Document", as well as the name of the file "temp.txt".

Names of all the subdirectories and files existing in the subdirectory "Photo" are listed immediately below the position of the subdirectory name "Photo". Specifically, the names listed just below the subdirectory "Photo" are subdirectories "May" and "April", and files "pic20070610.jpg", "pic20070611.jpg", and "pic20070612.jpg". These names are shifted to the right by a length for several letters in comparison with the starting point of the subdirectory name "Photo".

Similarly, names of all the files in the subdirectory "Music" are listed immediately below the position of the subdirectory name "Music". Specifically, the names of the files listed just below the subdirectory "Music" are "music1.mp3" and "music2.mp3". These names are shifted to the right by a length for several letters in comparison with the starting point of the subdirectory name "Music".

Since the subdirectory "Music" has no sub-subdirectories, only file names are listed just below the subdirectory "Music". Furthermore, since the subdirectory "Document" has neither files nor subdirectories, neither names of subdirectories nor names of files are listed in a lower right portion to the subdirectory name "Document". The file name "temp.txt" is listed immediately below the subdirectory name "Document" in the root directory.

The index file 50 lists, in a lower right position to the name of the subdirectory in the root directory, all the names of the files and the subdirectories in the subdirectory existing in the root directory. This allows the user to recognize all the files and all the subdirectories in the subdirectory. The single index file 50 shows files and subdirectories existing in the two-level hierarchy of the directory structure. If no name is given in the lower right portion to the name of one subdirectory in the root directory, but a file name or another subdirectory name is given immediately below the subdirectory in the same root directory, the user can recognize that the one subdirectory has neither files nor subdirectories.

Thumbnails 50*b* are displayed at the right to the names of the image files "pic20070610.jpg", "pic20070611.jpg", and "pic20070612.jpg" in the subdirectory "Photo". Another thumbnail 50*b* is also displayed at the right to the names of the document file "temp.txt" existing in the root directory. AThethumbnail 50*b* is prepared for an image file, a document file, and a drawing file. Each thumbnail 50*b* is created by reducing the size of images or pages. The user can check the contents of the image file, the document file, or the drawing file, by its corresponding thumbnail 50*b* attached to the index file 50.

The index file 50 has a link to a dummy file 18*a*, to be described later, by embedding a position (hereinafter, referred to as a "path") of the dummy file 18*a* in association with the corresponding file name. The index file 50 also has a link to a dummy file 18*a* by embedding a path of the dummy file 18*a* in association with the corresponding subdirectory name. When the user clicks a file name or subdirectory name in the index file 50 displayed on the WWW browser 24*a* by using a mouse 27, the WWW browser 24*a* sends a command to transfer the dummy file 18*a* to the card reader 10 ("get" command) by using the link set in association with the clicked name. Accordingly, the specified dummy file 18*a* is transferred from the card reader 10.

Referring to FIG. 2(*b*), the dummy file 18*a* created for each subdirectory is described. FIG. 2(*b*) shows the contents of the dummy file "Photo_dummy.html" created for the subdirectory "Photo" (hereinafter, referred to as a "Photo dummy file").

The dummy file is a hypertext-format file described in HTML. The dummy file has a meta tag <META HTTP EQUIV="Refresh" CONTENT="0;url=Photo/_index.html"> as a part of header information, between tags <HEAD> and </HEAD> identifying the header information section of an HTML document.

This meta tag instructs the WWW browser 24*a* to access a file indicated (linked) by the character string "url=" without using a cache 24*b*. The number "0" of "CONTENT="0"" means that the WWW browser 24*a* will access the linked file after zero seconds.

Here, The path designated by "url=" is "Photo/_index.html" that indicates the index file in the subdirectory "Photo". Accordingly, the WWW browser 24*a* receives the Photo dummy file, the WWW browser 24*a* sends a command ("get" command) to transfer the "Photo/_index.html", to the card reader 10 after zero second.

The dummy files 18*a* to be created for the other subdirectories are the same as the Photo dummy file except that each of the dummy files 18*a* has a link, set between the meta tags, to the index file of the corresponding subdirectory, so their detailed description is omitted here.

Referring to FIG. 2(*c*), the dummy file 18*a* to be created for each file is described. FIG. 2(*c*) shows the contents of the dummy file "temp_txt_dummy.html" created for the file "temp.txt" (hereinafter, referred to as a "temp.txt dummy file").

The temp.txt dummy file is different from the Photo dummy file, in that the temp.txt dummy file is linked by "url=" to the file "temp.txt" based on which the temp.txt dummy file is created.

The dummy files 18a to be created for the other files are the same as the temp.txt dummy file, except that each of the dummy files has a link to the corresponding file based on which each dummy file is created, set between the meta tags, so their detailed description is omitted here.

Referring back to FIG. 1, the index file-creation processing module is described. When the get-command processing module 12b starts the index file-creation processing module 12c, the CPU 11 firstly detects all the subdirectories and files in the directory that includes the index file designated by the "get" command. That is, the firstly detected subdirectories are immediately lower in level of the hierarchy structure than the directory that includes the index file. Second, the CPU 11 detects all the files and subdirectories in each of the firstly detected subdirectories. That is, the secondly detected subdirectories are immediately lower in level of the hierarchy structure than the firstly detected subdirectories. The CPU 11 then creates an index file based on all of the detected subdirectories and files.

The CPU 11 creates a dummy file 18a as shown in FIG. 2(b) and FIG. 2(c) for each file and each subdirectory. If the CPU 11 detects any of an image file, a document file, and a drawing file, the CPU 11 creates thumbnails corresponding to each of the image file, the document file, and the drawing file. In order to create the index file that is displayed as shown in FIG. 2(a), the CPU 11 sets a link that designating to the dummy file 18a in association with the corresponding name of subdirectories. The CPU 11 sets a link that designating to the dummy file 18a in association with the corresponding name of files. The CPU 11 further attaches a thumbnail by associating corresponding name of files.

After the index file is created, the CPU 11 finishes executing the index file-creation processing module 12c. If the CPU 11 determines that the directory for the index file has neither files nor subdirectories, the CPU 11 creates an index file indicating that no file is contained, and then finishes executing the index file-creation processing module 12c.

The RAM 13 is a rewritable, volatile memory for temporarily storing data to be required when the CPU 11 executes various programs. The RAM 13 includes a file directory storage area 13a, a thumbnail storage area 13b, and an index file storage area 13c.

The file/directory storage area 13a is a memory area to be used when the CPU 11 executes the index file-creation processing module 12c. The file/directory storage area 13a is for storing the names of the files and the names of the subdirectories acquired from the memory card 18, by associating the paths of corresponding dummy files 18a. If the thumbnail has been created for the file, the file/directory storage area 13a also stores the path of the thumbnail associating with the corresponding file name. Based on the data stored in the file/directory storage area 13a, the CPU 11 creates the index file. After the index file is created, the CPU 11 releases the file/directory storage area 13a.

The thumbnail storage area 13b is a memory area to be used when the CPU 11 executes the index file-creation processing module 12c. The thumbnail storage area 13b is for storing thumbnail data created for the image, document, and drawing files. Based on the information of the file/directory storage area 13a, the CPU 11 creates the index file, in which the thumbnails stored in the thumbnail storage area 13b are attached (associated) with the file names. After the index file is created, the CPU 11 releases the thumbnail storage area 13b.

The index file storage area 13c is a memory area for storing the index file temporarily. When the CPU 11 creates the index file in accordance with the index file-creation processing module 12c, the CPU 11 stores the index file in the index file storage area 13c temporarily. The index file stored in the index file storage area 13c is transferred to the PC 20, by the get-command processing module 12b executed by the CPU 11. After the index file has completely been transferred to the PC 20, the CPU 11 releases the index file storage area 13c.

The LAN interface 14 is an interface which controls the card reader 10 to connect to the LAN 40. The card reader 10 transmits data to and receives data from the PC 20 connected to the LAN 40 through the LAN interface 14.

The memory card interface 15 reads data from the memory card 18, and writes data therein in accordance with an input-output specification of the memory card 18, when the memory card 18 is mounted in a card slot (not shown) included in the card reader.

The memory card 18 includes a rewritable flash memory which maintains the information stored therein even when the power is shut off. Various types of flash memories are commercially available such as an SD card and an XD card. The memory card 18 stores files according to directory structure having a plurality of hierarchy levels.

The memory card 18 also stores the dummy file 18a created by the index file-creation processing module 12c, for each of files and subdirectories in the memory card 18. The path of the dummy file 18a is temporarily stored in the file-subdirectory storage area 13a by associating with the name of file or subdirectory.

The timer circuit 16 includes an internal clock for informing a current date and time. The timer circuit 16 is a known circuit for calculating an elapsed time, by comparing, with the current date and time, the date and time when the timer is started.

The PC 20 is a client device which can access the memory card mounted in the card slot (not shown) of the card reader 10 through the WWW browser 24a. As shown in FIG. 1, the PC 20 includes a CPU 21, a ROM 22, a RAM 23, a hard disk drive 24, a LAN interface 25, a keyboard 26, a mouse 27, an LCD 28, and a timer circuit 29 that are connected to one another through a bus line 30.

The CPU 21 is an arithmetic unit for controlling the devices (the ROM 22, the RAM 23, the hard disk drive 24, the LAN interface 25, the keyboard 26, the mouse 27, the LCD 28, and the timer circuit 29) connected through the bus line 30, in accordance with various signals communicated through the LAN interface 25 or in accordance with programs or data stored in the ROM 22, the RAM 23, or the hard disk drive 24.

The ROM 22 is an unwritable memory which stores BIOS (Basic Input/Output System) as a program for controlling the input to and the output from the RAM 23, the hard disk drive 24, the keyboard 26, the mouse 27, and the LCD 28, connected to the PC 20. The ROM 22 also stores various settings to be referred to when the CPU 21 executes the BIOS. The RAM 23 is a rewritable, volatile memory for temporarily storing a program or data to be required when the CPU 21 executes various programs.

The hard disk drive 24 is a rewritable, nonvolatile memory disk which stores various programs to be executed by the CPU 21 such as an OS and application programs, as well as various settings. The hard disk drive 24 stores the WWW browser 24a, the cache 24b, and a memory-card access request file 24c.

The WWW browser 24a is an application program to be executed by the CPU 21, for displaying a hypertext-format file on the LCD 28. The WWW browser 24a displays the hypertext-format file in such a manner that the links set in the hypertext-format file are selectable by using the mouse 27.

When one of the links displayed by the WWW browser 24a is selected by the mouse 27, the WWW browser 24a, via FTP, sends a command ("get" command) to transfer the file designated by the path of the selected link, and then receives the file that is returned in response to the transfer command or an "NG" code. If the WWW browser 24a receives the file, the WWW browser 24a displays the file. If the WWW browser 24a receives an "NG" code, the WWW browser 24a displays an error message saying that no file has been received.

The cache 24b is a memory area to be used by the WWW browser 24a. If the WWW browser 24a receives a file by sending the transfer command ("get" command), the WWW browser 24a saves the received file in the cache 24b. The WWW browser 24a holds the file in the cache 24b unless the user deletes the file. If the WWW browser 24a accesses the same file again, the WWW browser 24a can read the file from the cache 24b without sending, to the server, a command to transfer the file. Accordingly, the WWW browser 24a can read each file with speed.

However, if the received hypertext-format file contains instruction information to instruct the WWW browser 24a to access the specified file without using the cache 24b, as described for the dummy file, the WWW browser 24a directly sends a command to transfer the specified file, to the server, instead of reading the file from the cache 24b. Accordingly, the WWW browser 24a can receive each file in a latest state.

The memory-card access request file 24c contains instruction information instructing the WWW browser 24a to receive the index file 50 from the root directory of the memory card 18 mounted on the card reader 10. As the user selects the memory-card access request file 24c through the keyboard 26 or the mouse 27, the WWW browser 24a is started. The WWW browser 24a then sends a command ("get" command) to transfer the index file 50 of the root directory, to the card reader 10, via FTP, in accordance with the instruction information of the memory-card access request file 24c.

Figures 3A, 3B:
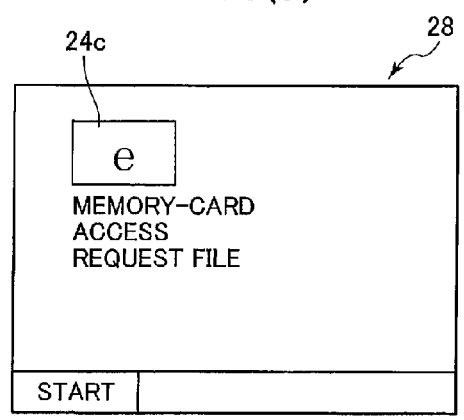
FIG. 3(a) shows a desktop environment displayed on the LCD by an OS of the PC.
FIG. 3(b) shows a content of a memory-card access request file "dummy.html"

Referring to FIGS. 3(a) and 3(b), the memory-card access request file 24c is explained in detail. FIG. 3(a) shows a desktop environment displayed on the LCD 28 by the OS of the PC 20. As shown in FIG. 3(a), the icon "memory-card access request file" is provided on the OS desktop environment for the memory-card access request file 24c. In order to select the memory-card access request file 24c, the user moves the cursor to the icon "memory-card access request file" by using the keyboard 26 or the mouse 27, and then depresses the enter key (not shown) of the keyboard 26 or the click button (not shown) of the mouse 27.

FIG. 3(b) shows the contents of the memory-card access request file 24c "dummy.html" (hereinafter, referred to as a dummy.html 24c). The dummy.html 24c has a meta tag similar to the meta tag contained in the Photo dummy file shown in FIG. 2(b).

The meta tag is different from the meta tag of the Photo dummy file, in that "url=" designates the path "//aaa/_index.html" indicating the index file of the root directory in the memory card 18. When the user selects the memory-card access request file 24c, the WWW browser 24a sends a command ("get" command) to transfer the "//aaa/_index.html", to the card reader 10, after zero seconds, in accordance with the contents of the dummy.html 24c.

The character string "ftp:" following "url=", instructs the WWW browser 24a to send a command ("get" command) to transfer the "//aaa/_index.html" via FTP.

The LAN interface 25 is an interface to connect the PC 20 to the LAN 40. The keyboard 26 and the mouse 27 allow the user to input a character or an instruction to the PC 20. The LCD 28 displays various kinds of information of the program executed by the CPU 21. The timer circuit 29 includes an internal clock for informing a current date and time. The timer circuit 29 is a known circuit for calculating an elapsed time, by comparing the date and time when the timer is started, and the current date and time.

Figure 4:
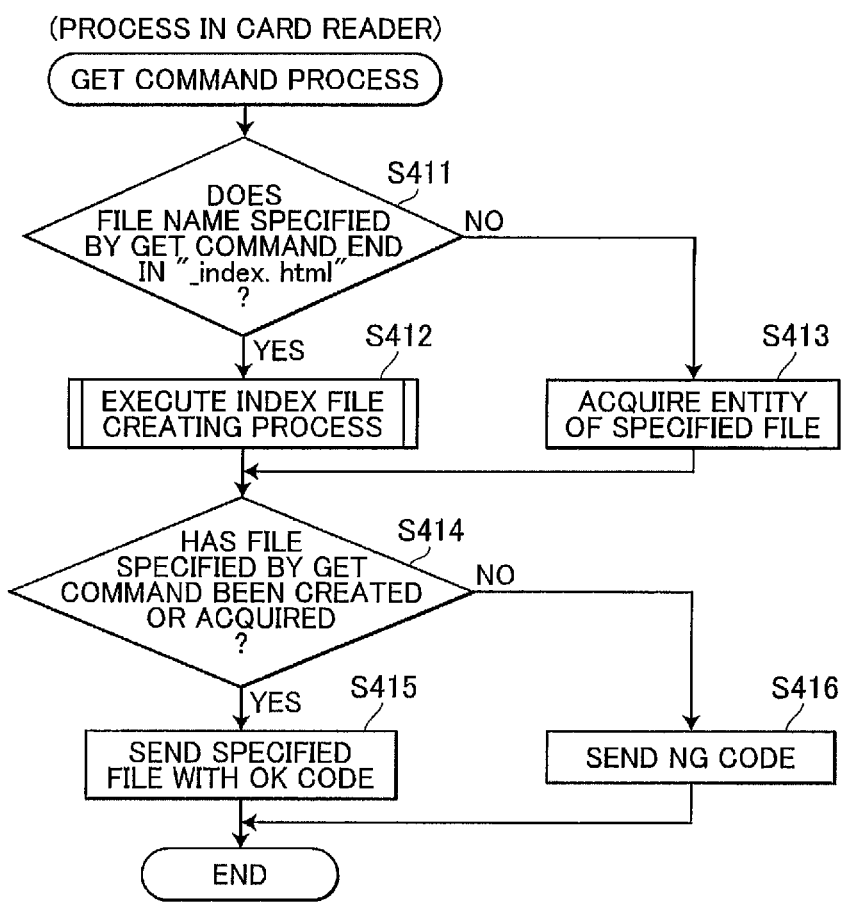
FIG. 4 is a flowchart showing a get command process that is performed while executing a get-command processing module.

Referring to FIG. 4, a description is given for the flow of a get command process that is performed when executing the get command processing module 12b by the CPU 11 of the card reader 10. FIG. 4 is a flowchart showing the get command process. As described above, the get-command processing module 12b is started if a "get" command is inputted from the PC 20 during the CPU 11 is executing the FTP server program 12a.

In S411, the CPU 11 determines whether or not the file name specified (designated) by the "get" command ends in the character string "_index.html". In the file transfer system 1, the file name of an index file is defined to include the "_index.html". Thus, in S411, the CPU 11 determines whether or not the file specified by the "get" command is an index file.

If the name of the file specified by the "get" command ends in "_index.html" (S411: Yes), that is, the specified file is an index file, in S412 the CPU 11 executes an index file-creation processing module 12c (index file-creation process) to be described later. As a result, the index file is created for a prescribed directory, and the created index file is stored in an index file storage area 13c. On the other hand, the name of the file specified by the "get" command does not end in "_index.html" (S411: No), the CPU 11 determines that the specified file is a file whose entity is stored in the memory card 18. In S413, the CPU 11 acquires the entity of the specified file by reading the file from the memory card 18.

In S414, the CPU 11 determines whether or not the file specified by the "get" command has been created in S412, or alternatively whether or not the file specified by the "get" command has been acquired in S413. If the specified file has been created or acquired (S414: Yes), in S415 the CPU 11 sends (replies), to the PC 20, the index file stored in the index file storage area 13c with an "OK" code in S412, or the file with an "OK" code acquired in S413. The CPU 11 then finishes executing the module. Accordingly, the CPU 11 can transfer the file specified by the "get" command to the PC 20.

On the other hand, the CPU 11 determined that the file specified by the "get" command has been neither created nor acquired (S414: No), in S416 the CPU 11 sends, as a reply, an "NG" code to the PC 20. The CPU 11 then finishes executing the module. Accordingly, the card reader 10 notifies the user of the PC 20 that the file specified by the "get" command does not exist.

The CPU 11 performs the process in response to the "get" command inputted from the PC 20 by executing the get-command processing module 12b. If the file specified by the "get" command is an index file, the CPU 11 creates the index file. If the file specified by the "get" command is a file stored in the memory card 18, the CPU 11 acquires the entity of the file from the memory card 18, and then transfers the acquired entity to the PC 20.

Figure 5:
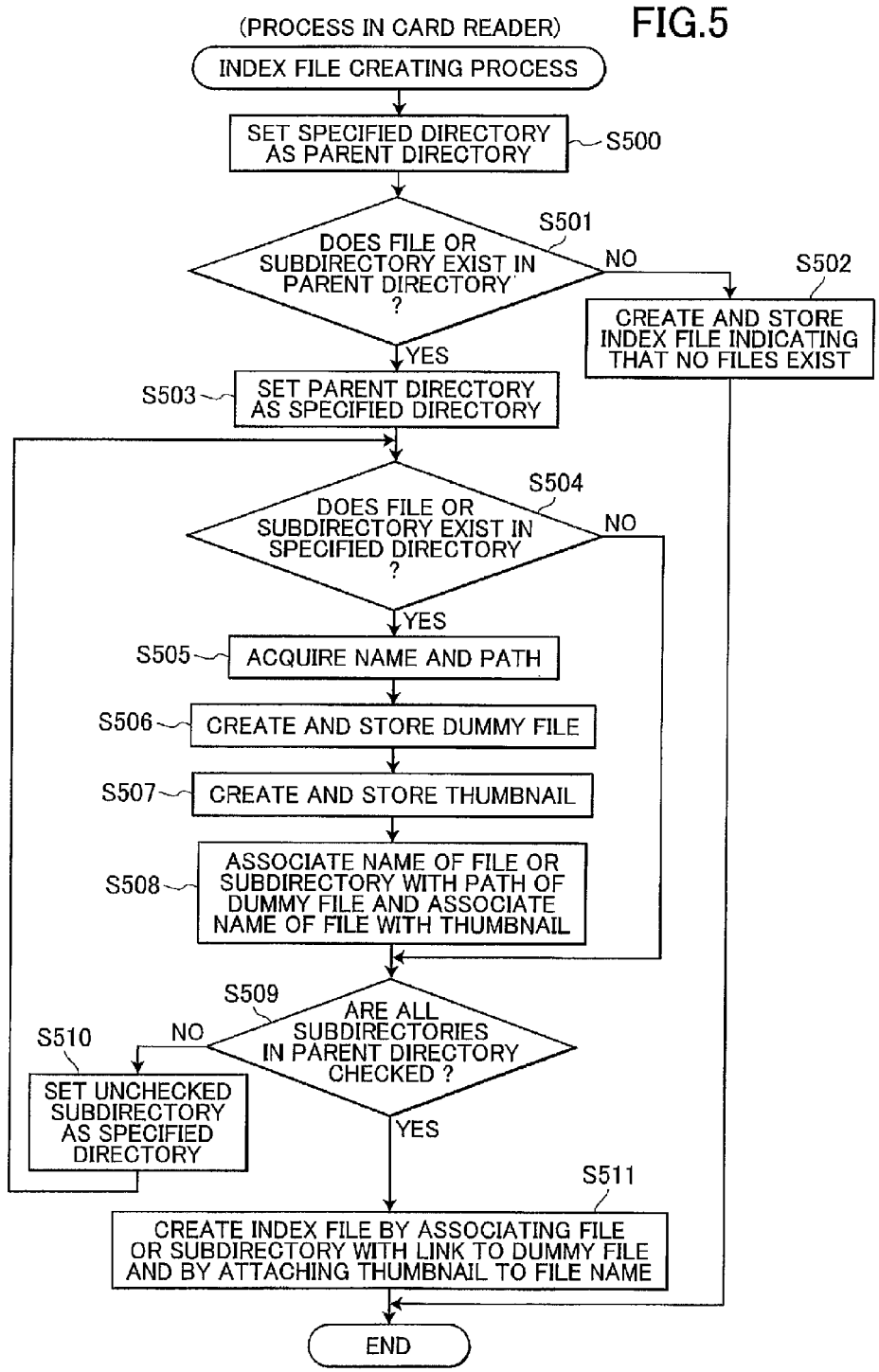
FIG. 5 is a flowchart showing an index file creating process that is performed while executing an index file-creation processing module.

Referring next to the flowchart of FIG. 5, a description is given for the process to be executed in the index file-creation processing module 12c by the CPU 11. FIG. 5 is a flowchart showing the index file creating process to be performed while executing the index file-creation processing module 12c. In this module, the CPU 11 creates the index file of a prescribed directory, and then stores the created index file in the index file storage area 13c.

In S500, as shown in FIG. 5, the CPU 11 specifies the directory in which an index file exists (or, practically, is treated as existing), from the path of the index file specified by a "get" command, and then sets the specified directory as a parent directory.

In S501, the CPU 11 determines whether or not any file of subdirectory exists in the parent directory. if neither files nor subdirectories exist in the parent directory (S501: No), in S502 the CPU 11 creates the index file indicating that no files exist therein, and stores the created index file in the index file storage area 13c. The CPU 11 finishes executing the module 12c. As the index file is displayed through the WWW browser 24a, the user of the PC 20 finds that no files exist in the specified directory.

On the other hand, if the CPU 11 determines that any file or subdirectory exists in the parent directory (S501: Yes), the CPU 11 proceeds to S503. In S503 the CPU 11 starts creating a list that includes all the files and subdirectories stored (existing) in the parent directory or the subdirectories existing in the parent directory. That is, the list describes all the files and the subdirectories stored in the parent directory and all the files and all the subdirectories stored in each of the subdirectories stored (existing) in the parent directory. In other words, the index file firstly lists all the subdirectories that is immediately lower in level of the hierarchy structure than the parent directory, and secondly lists the subdirectories that is immediately lower in level of the hierarchy structure than the firstly listed subdirectories, and further lists all the files in the parent directory, the firstly listed subdirectory, and the secondly listed subdirectories.

In S503, the CPU 11 sets the parent directory as a specified directory. In steps from S504 to S508, the CPU 11 executes the process for the specified directory. As described later, in S510 the CPU 11 sets, to the specified directory, not only the parent directory, but also each subdirectory existing in the parent directory.

In S504, the CPU 11 determines whether or not any file or subdirectory exists in the specified directory. If the CPU 11 determines that any file or subdirectory exists in the specified directory (S504: Yes), the CPU 11 proceeds to S505. In S505 the CPU 11 prepares data required by the specified directory for creating an index file. On the other hand, if neither files nor subdirectories exist in the specified directory (S504: No), that is, the specified directory does not require any data preparation for creating an index file, the CPU 11 proceeds to S509.

In S505, the CPU 11 detects all the files and subdirectories existing in the specified directory, and then acquires the names and paths of the files and subdirectories that are stored in the specified directory from the memory card 18. As a result, the CPU 11 acquires the names and paths of all the files and subdirectories existing in the specified directory.

In S506, the CPU 11 creates the above described dummy file for all of subdirectories and files existing in the specified directory. Each path acquired in S505 is set in the corresponding dummy file as a linked path when the CPU 11 creates the dummy files. That is, when the CPU 11 creates the dummy file, the path acquired in S505 is used (described) as a linked URL in the corresponding dummy file.

In S507, for each of image files, document files, and drawing files among the files existing in the specified directory, the CPU 11 creates a thumbnail by reducing the size of image or page of the file, and then stores the created thumbnail in the thumbnail storage area 13b.

In S508, the CPU 11 associates each subdirectory name existing in the specified directory with the path of the corresponding dummy file created in S506. The CPU 11 also associates each file name existing in the specified directory with the path of the corresponding dummy file created in S506. Further, the CPU 11 associates each file name with the corresponding thumbnail if the thumbnail has been created for the file. That is, if the thumbnail has been created for the file, the CPU 11 associates the file name with the path of the dummy file and the thumbnail. The CPU 11 stores the associated names, paths and thumbnails in a file/directory storage area 13a. The CPU 11 completes the data preparation required by the specified directory for creating the index file, and then proceeds to S509.

In S509, the CPU 11 determines whether or not the CPU 11, in S504, has determined the existence of the files and the subdirectories for all the subdirectories existing in the parent directory. That is, the CPU 11 determines whether all the subdirectories in the parent directory are checked. In other words, in S509 the CPU 11 determines whether the all the directories in the parent directories are set as the specified directory. If any subdirectory in the parent directory is left unchecked (S509: No), in S510 the CPU 11 newly sets one of the unchecked subdirectories as a specified directory, and then executes the steps from S504 to S509 again. In S504, the CPU determines whether or not any file or subdirectory exists in the newly specified directory. If any file or subdirectory exists in the newly specified directory (S504: Yes), in steps S505-S508 the CPU 11 prepares data required by the newly specified directory for creating an index file.

The CPU 11 repeats the steps from S504 to S510 until the CPU 11 determines that the CPU 11 has completed to determine the existence of the files and the directories for all the subdirectories in the parent directory (S509: Yes). Through this repetition, the CPU 11 completes data preparations required by the parent directory and all the subdirectories existing in the parent directory, for creating an index file.

If the CPU 11 determines that the CPU 11 has completed to determine the existence of the files and the directories for all the subdirectories in the parent directory (S509: Yes), in S511 the CPU 11 creates an index file as shown in FIG. 2(a) based on the information stored in the file/directory storage area 13a. Specifically, in S511 the CPU 11 creates the index file by setting each name of the files and the directories, which are stored in the file/directory storage area 13a, to the link to the dummy file corresponding to the name. Further, in this creation of the index file, the CPU 11 attaches the thumbnail to each name of the files for which the thumbnail is created. The CPU 11 stores the created index file in the index file storage area 13c, and then ends the index file-creation processing module 12c.

Figure 6:
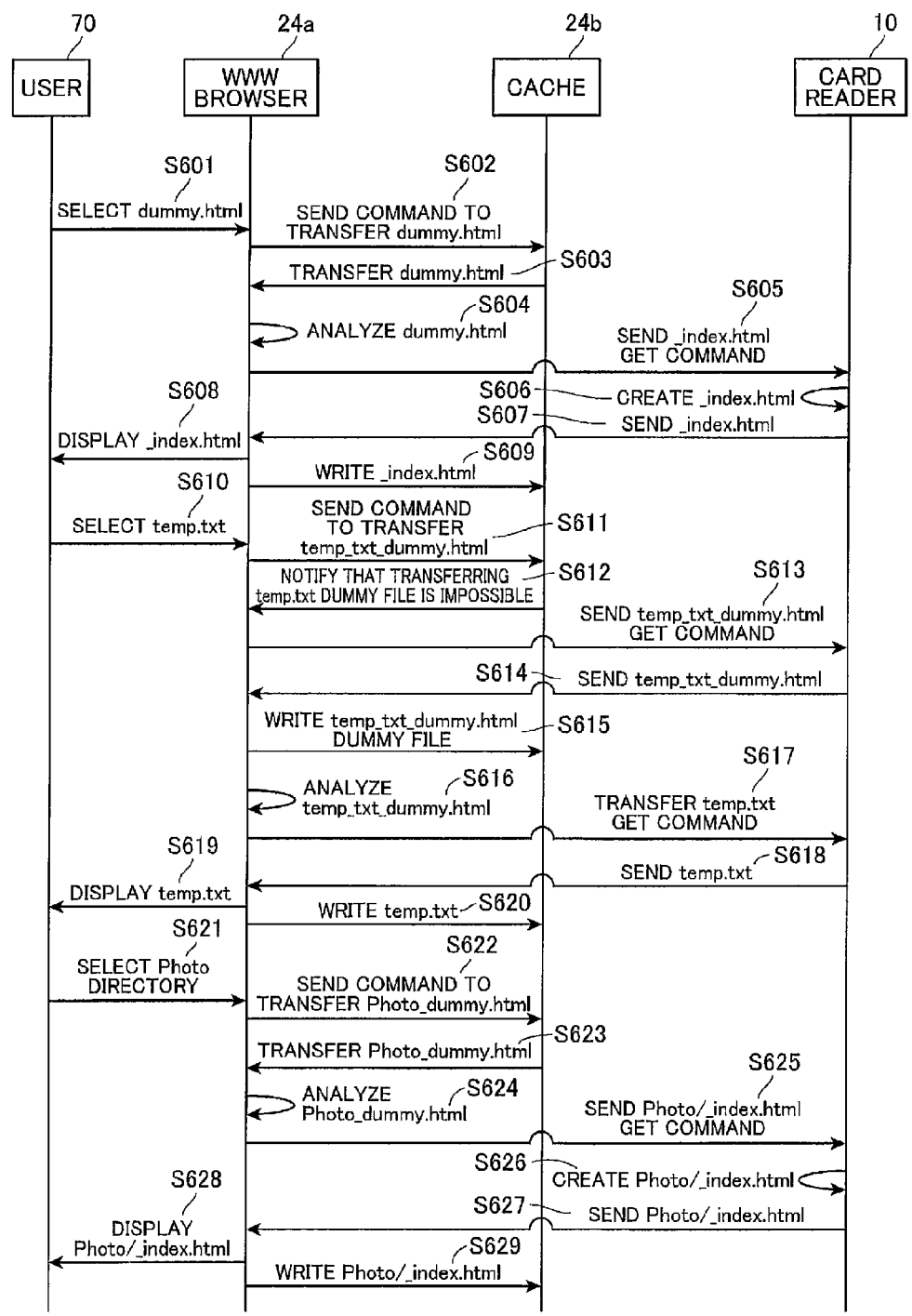
FIG. 6 is a sequence chart showing an operational sequence of the file transfer system.

Referring to FIG. 6, an operation of the file transfer system 1 is described. FIG. 6 is a sequence chart showing an operational sequence of the file transfer system 1. As shown in FIG. 6, in the file transfer system 1, when in S601 the user 70 of the PC 20 selects the dummy.html (memory-card access request file) 24c provided on the desktop environment displayed on the screen of the LCD 28 of the PC 20, the CPU 21 starts the WWW browser 24a, and notifies the WWW browser 24a that the dummy.html 24c has been selected. In response, in S602 the WWW browser 24a sends a command to transfer the dummy.html 24c, to the cache 24b.

In S603, if the dummy.html 24c exists in the cache 24b, the cache 24b transfers the dummy.html 24c to the WWW browser 24a. On the other hand, if the dummy.html 24c does not exist in the cache 24b, the cache 24b notifies the WWW browser 24a that transferring the dummy.html 24c is impossible. In this case, the WWW browser 24a reads the dummy.html 24c directly from the card reader 10, and writes the read dummy.html 24c in the cache 24b.

In S604, the WWW browser 24a analyzes the contents of the dummy.html 24c. In S605, the WWW browser 24a sends a command ("get" command) to transfer, to the card reader

10, the index file "_index.html" in the root directory of the memory card 18 without using the cache, in accordance with the contents of the dummy.html 24c. Accordingly, the card reader 10 can create the "_index.html" in the latest state even when the cache 24b has previously stored the "_index.html".

In S606, the card reader 10 creates the "_index.html" by detecting each of files and subdirectories existing in the root directory by using the index file-creation processing module 12c. In S607, the card reader 10 sends, as a reply, the created "_index.html" to the WWW browser 24a. In S608, the WWW browser 24a displays the received "_index.html" to the user 70.

Since the card reader 10 thus detects each file and each subdirectory existing in the root directory, to create the "_index.html", the WWW browser 24a can display each file and each subdirectory existing in the root directory correctly. Since the "_index.html" is newly created every time the card reader 10 receives a command ("get" command) to transfer the "_index.html", the index file is affected by all the files and subdirectories currently existing in the root directory. Thus, the WWW browser 24a can display the latest information of the files and the subdirectories stored in the memory card 18.

In S609, the WWW browser 24a displays and writes the "_index.html" in the cache 24b. As described above, the WWW browser 24a does not read the "_index.html" in the cache 24b because of meta tags in the dummy file 24c. That is, the WWW browser 24a sends a command to transfer the "_index.html" ("get" command), to the card reader 10, without reading the "_index.html" written in the cache 24b, according to the dummy.html 24c.

In S610, the user 70 selects the file name "temp.txt" from the "_index.html" displayed by the www browser 24a. In S611, the WWW browser 24a sends a command to transfer the temp.txt dummy file "temp_txt_dummy.html", to the cache 24b, based on the link set in the file name "temp.txt".

In S612, if the temp.txt dummy file does not exist in the cache 24b, the cache 24b notifies the WWW browser 24a that transferring the temp.txt dummy file is impossible. In S613, the WWW browser 24a sends a command ("get" command) to transfer the temp.txt dummy file, to the card reader 10. In S614, the card reader 10 acquires the temp.txt dummy file stored in the memory card 18, and then transfers the acquired file (temp.txt dummy file) to the WWW browser 24a. In S615, the WWW browser 24a receives the temp.txt dummy file, and then writes the file in the cache 24b.

On the other hand, if the temp.txt dummy file exists in the cache 24b, the temp.txt dummy file is transferred from the cache 24b to the WWW browser 24a. Since the contents of the temp.txt dummy file is the same as the contents shown in FIG. 2(c), that is, the contents of the dummy file is invariant, the temp.txt dummy file previously stored in the cache 24b is used without problems.

In S616, the WWW browser 24a analyzes the contents of the temp.txt dummy file. In S617, the WWW browser 24a sends a command ("get" command) to transfer the file "temp.txt" stored in the memory card 18, to the card reader 10 without using the cache, in accordance with the contents the temp.txt dummy file. In S618, in response to the transfer command, the card reader 10 acquires the "temp.txt" stored in the memory card 18, and then transfers the file "temp.txt" to the WWW browser 24a. In S619, the WWW browser 24 displays the "temp.txt" to the user 70. Accordingly, the WWW browser 24 can read the "temp.txt" in latest state from the card reader 10, and display the "temp.txt" to the user even when the cache 24b has previously stored the "temp.txt".

In S620, the WWW browser 24a displays and writes the "temp.txt" in the cache 24b. However, the WWW browser 24a does not read this "temp.txt" in the cache 24b, the WWW browser 24a sends a command ("get" command) to transfer the "temp.txt" to the card reader 10 without reading the "temp.txt" written in the cache 24b, according to the temp.txt dummy file.

On the other hand, in S621, the user 70 selects the subdirectory name "Photo" from the "_index.html" displayed by the WWW browser 24a. In S622, the WWW browser 24a sends a command to transfer the Photo dummy file "Photo_dummy.html", to the cache 24b, based on the link corresponding to the subdirectory name "Photo" in "_index.html".

In S623, if the Photo dummy file exists in the cache 24b, the cache 24b transfers the Photo dummy file to the WWW browser 24a. Since the contents of the Photo dummy file is the same as the contents shown in FIG. 2(b), the Photo dummy file previously stored in the cache 24b is used without problems.

If the Photo dummy file does not exist in the cache 24b, the steps from S613 to S615 performed for the temp.txt dummy file, are also performed for the Photo dummy file.

In S624, the WWW browser 24a analyzes the contents of the Photo dummy file. In S625, the WWW browser 24a sends a command ("get" command) to transfer the index file "Photo/_index.html" of the subdirectory "Photo", to the card reader 10 without using the cache, in accordance with the contents of the Photo dummy file.

Accordingly, the card reader 10 can create the file "Photo/_index.html" in the latest state even when the cache 24b has previously stored the "Photo/_index.html".

In S626, the card reader 10 creates the "Photo/_index.html" by detecting all the files and subdirectories existing in the subdirectory "Photo" by the index file-creation processing module 12c. In S627, the card reader 10 returns the created "Photo/_index.html" to the WWW browser 24a. In S628, the WWW browser 24a displays the received "Photo/_index.html" to the user 70.

Since the card reader 10 detects all the files and subdirectories existing in the subdirectory "Photo" and creates the "Photo/_index.html", the WWW browser 24a can display all the files and subdirectories existing in the subdirectory "Photo" correctly. Since the "Photo/_index.html" is newly created every time the card reader 10 receives a command ("get" command) to transfer the "Photo/_index.html", the index file is affected by all the files and subdirectories currently existing in the subdirectory "Photo". Thus, the WWW browser 24a can display the latest information about the files and the subdirectories stored in the memory card 18.

In S629, the "Photo/_index.html" displayed by the WWW browser 24a is written in the cache 24b. However, the WWW browser 24a sends a command ("get" command) to transfer the "Photo/_index.html", to the card reader 10, without reading the "Photo/_index.html" written in the cache 24b, according to the Photo dummy file.

As described above, in the file transfer system 1 according to the first embodiment, the card reader 10 detects files and subdirectories existing in a prescribed directory by the index file-creation processing module, and then creates an index file. According to the index file, the WWW browser 24a correctly displays the files and the subdirectories existing in the prescribed directory. Thus, the user can access a target file using the WWW browser 24a through the link set in the index file. Accordingly, the user can correctly access a file stored in the memory card 18 mounted in the card reader 10 from the PC 20.

Since all the files and the subdirectories existing in the prescribed directory can be displayed correctly by the WWW browser 24a according to the index file, the user of the PC 20 can guess the contents of files and subdirectories existing in the prescribed directory based on names of files and subdirectories included in the index file. Accordingly, the user can check a target file or a target subdirectory efficiently.

Furthermore, since the card reader 10 creates an index file in hypertext-format and then sends the index file to the WWW browser 24a, the PC 20 can display the index file as long as the PC 20 includes the WWW browser 24a that supports the hypertext-format file. Thus, even if the PC 20 includes a WWW browser that is different from the WWW browser 24a, the PC 20 can access each file in the card reader 10 in the same manner.

The card reader 10 creates an index file for the prescribed directory when the card reader 10 receives a command to transfer the index file in the prescribed directory. Thus, when the card reader 10 receives the index file transfer command, the index file is affected by each of files and subdirectories currently existing in the prescribed directory. Accordingly, the WWW browser 24a can display the latest information about each of files and subdirectories stored in the memory card 18.

The card reader 10 creates an index file by associating each name of the subdirectories existing in the prescribed directory with a link to an index file corresponding to the subdirectory name. As the user selects a subdirectory name from the index file displayed by the WWW browser 24a, the card reader 10 creates an index file for the subdirectory, and the created index file is displayed by the WWW browser 24a. Since the WWW browser 24a can display correctly each of subdirectories and files existing a subdirectory with simple operation. Accordingly, the PC 20 can access a file stored in a lower subdirectory easily.

The card reader 10 can instructs the WWW browser 24a to directly access a file or subdirectory stored in the memory card 18 without using the cache, according to a corresponding dummy file to which a file name in the index file is linked. When the user selects a file name or a subdirectory name through the WWW browser 24a, even if the cache has previously stored data for the selected file or the subdirectory, the PC 20 can access the file or the selected subdirectory in the latest state stored in the memory card 18.

The card reader 10 detects all the files and the subdirectories in the prescribed directory or in the subdirectories existing in the prescribed directory, and then creates an index file listing all the detected files and subdirectories. Thus, the user can check the list including all the files and the subdirectories in a prescribed directory and in the subdirectories existing in the prescribed directory, by a single index file transfer command. By using the link set to the subdirectory and to the file existing in the subdirectory, the user can access the subdirectory and the file. Thus, the user can find a target file in a lower-level hierarchy stored in a subdirectory positioned within the memory card 18, and can access the file with simple operation.

The card reader 10 creates a thumbnail for image, document and drawing files. The card reader 10 creates an index file by attaching each thumbnail in association with a corresponding file name. Thus, the user of the PC 20 can check the content of file by seeing the thumbnail in the index file displayed by the WWW browser 24a. Thus, the user can order the PC 20 to check the contents of each file stored in the memory card 18 easily.

Second Embodiment

Referring next to FIG. 1, and FIGS. 7(a) and 7(b) to FIG. 9, the file transfer system 1 according to a second embodiment is described. In the file transfer system 1 according to the second embodiment, the card reader 10 communicates with the PC 20 via HTTP (Hypertext Transfer Protocol). The card reader 10 then transfers the file stored in the memory card 18 to the PC 20 through the LAN 40. In this case, the card reader 10 sends a file with a command added to the HTTP header field. Here, this command instructs the WWW browser 24a not to cache the file.

The electrical configuration of the file transfer system 1 according the second embodiment is the same as in the first embodiment except the following points, so the drawing thereof is omitted here. Referring to FIG. 1, a description is given for the difference between the first and second embodiments.

In the second embodiment, the ROM 12 stores an HTTP server program 1012a, a get-command processing module 1012b, and a file-creation processing module 1012c instead of the FTP server program 12a, the get-command processing module 12b, and the file-creation processing module 12c according to the first embodiment. The HTTP server program 1012a is executed by the CPU 11 when the CPU 11 communicates with the PC 20 via HTTP. The HTTP server program 1012a has the same contents as the FTP server program 12a except that the HTTP server program 1012a conforms to HTTP as a communications protocol.

The get-command processing module 1012b works with the HTTP server program 1012a. The file-creation processing module 1012c works with the get-command processing module 1012b.

The get-command processing module 1012b is a program which controls the CPU 11 to execute a get command process in response to an HTTP "get" command. The get-command processing module 1012b works with the HTTP server program 1012a. Similarly to the FTP "get" command, the HTTP "get" command is a transfer command to instruct the card reader 10 to transfer the file specified by the PC 20. When the CPU 11 receives a "get" command from the PC 20 during executing the HTTP server program 1012a, the CPU 11 starts executing the get-command processing module 1012b. After sending, as a reply, the file specified by the "get" command or returning an error code to the PC 20, the CPU 11 finishes the execution of the module 1012b.

The get-command processing module 1012b according to the second embodiment is different from the get-command processing module 12b according to the first embodiment in the following respects. First, if the file specified by a "get" command is an index file, the CPU 11 executes an index file-creation processing module 1012c according to the second embodiment, to be described later. Next, when the CPU 11 sends (replies), to the PC 20, the file specified by the "get" command with a command added to the HTTP header field instructing the WWW browser 24a not to cache the file. That is, the CPU 11 sends the command added to the HTTP header field prohibiting the WWW browser 24a from caching the file as a preparation for sending the file. Furthermore, if the CPU 11 cannot create an index file for the file specified by the "get" command by the index file-creation processing module 12c, or if the CPU 11 cannot acquire the entity of the file from the memory card 18, the CPU 11 returns an HTTP error code to the PC 20.

Figure 7A:
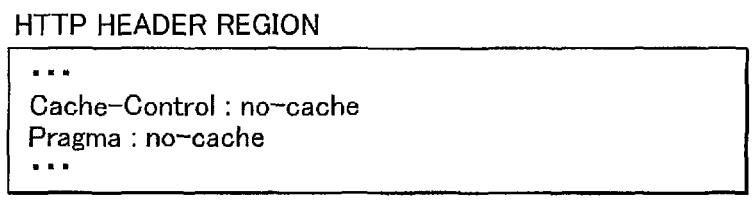
FIG. 7(a) shows a content of the HTTP header field.
Figure 7B:
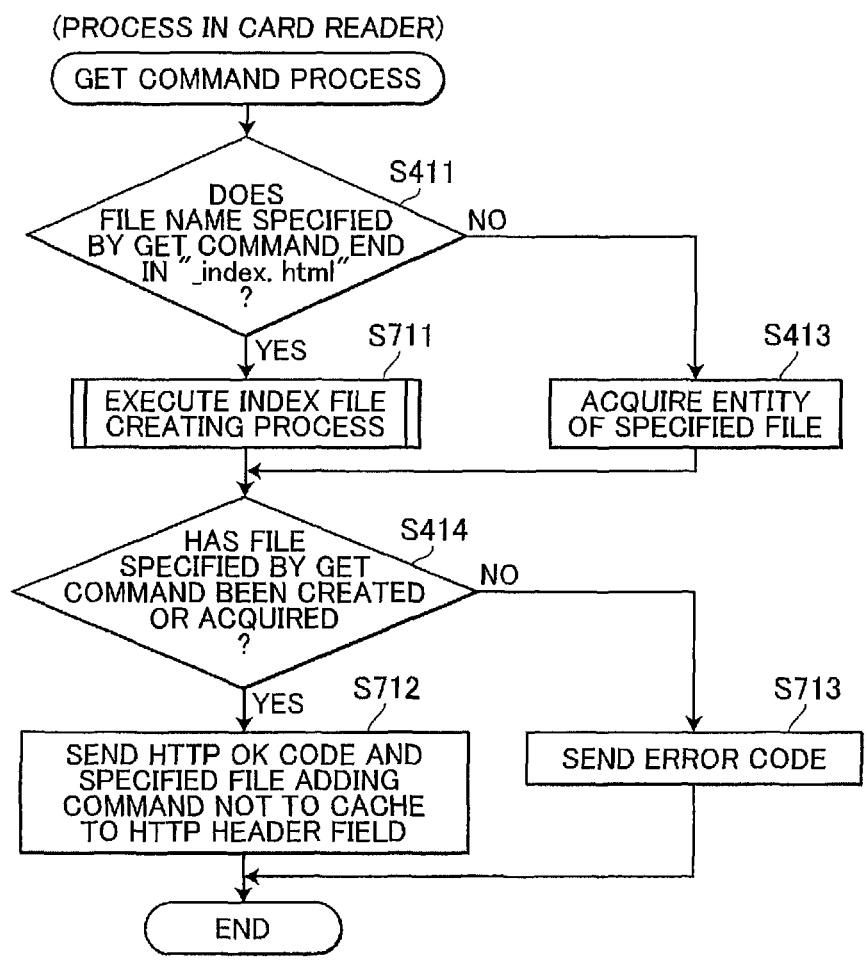
FIG. 7(b) is a flowchart showing a get command process that is performed while executing a get-command processing module according to a second embodiment.

Referring to FIG. 7(a), a description is given for the contents of the command that is added to the HTTP header field when the file specified by the "get" command is transferred to the PC 20 in the second embodiment. FIG. 7(a) shows the contents of the HTTP header field.

As shown in FIG. 7(a), two HTTP headers are added to the HTTP header field: "Cache-Control: no-chache" and "Pragma: no-chache". Both of the HTTP headers instruct the WWW browser 24*a* not to cache the file. The header "Cache-Control: no-chache" is compliant with HTTP/1.1 version. The header "Pragma: no-chache" is compliant with HTTP/1.0 version. Both HTTP headers are added in case the WWW browser 24*a* supports only either one of the two HTTP versions.

Similarly to the index file-creation processing module 1012*c* according to the first embodiment, the index file-creation processing module 1012*c* according to the second embodiment is a program which controls the CPU 11 to create an index file. The index file-creation processing module 1012*c* works with the get-command processing module 1012*b*. If the CPU 11 determines that the file specified by a "get" command is an index file while executing the get-command processing module 1012*b*, the CPU 11 starts executing the index file-creation processing module 1012*c*. After storing the created index file in the index file storage area 13*c*, the CPU 11 finishes the execution of the module 1012*c*.

The index file-creation processing module 1012*c* according to the second embodiment is different from the index file-creation processing module 1012*c* according to the first embodiment in the following respect. In an index file created by the index file-creation processing module 1012*c* in the second embodiment, each file name has a direct link to the entity of the file, and each subdirectory name has a direct link to the index file existing (or, practically, is treated as existing) in the subdirectory.

Since no dummy file is required in the second embodiment, the memory card 18 does not require any area for saving a dummy file.

A description is given for the difference between the PC 20 according to the second embodiment and the PC 20 according to the first embodiment. The WWW browser 24*a* according to the first embodiment connects to the linked server via FTP, whereas the WWW browser 24*a* according to the second embodiment connects to the linked server via HTTP. Specifically, as the user selects a link set in the displayed index file, the WWW browser 24*a* according to the second embodiment sends, via HTTP, a command ("get" command) to transfer each file existing in the path specified by the link. Subsequently, the WWW browser 24*a* receives the file or the error code returned in response to the transfer command.

The memory-card access request file 24*c* describes instruction information to instruct the WWW browser 24*a* to access the "_index.html" in the root directory stored in the memory card 18 via HTTP. When the user selects the memory-card access request file 24*c*, the WWW browser 24*a* is started. The WWW browser 24*a* sends a command to transfer the "_index.html" to the card reader 10 via HTTP.

Referring to FIG. 7(*b*), a description is given for the flow of a get command process that is performed while executing the get-command processing module 1012*b* according to the second embodiment. The same steps as the first embodiment have the same reference numerals, and their detailed description is omitted here.

In this process, the steps S411, S413, and S414 are the same in the steps performed in the get-command processing module 12*b* according to the first embodiment (see FIG. 4(*b*)). If the name of the file specified by the "get" command ends in "_index.html" (S411: Yes), indicating that the specified file is an index file, in S711 the CPU 11 executes the index file-creation processing module 1012*c* according to the second embodiment. As a result, an index file is created, in which a file name has a direct link to the corresponding file, and in which each subdirectory name has a direct link to the index file existing in the corresponding subdirectory. After S711, the CPU 11 proceeds to S414.

If the specified file has been created or acquired (S414: Yes), in S712 the CPU 11 sends (replies), to the PC 20, an HTTP "OK" code and the file specified by the "get" command adding a command instructing the WWW browser 24*a* not to cache the file to the HTTP header field. The CPU 11 finishes the execution of the get-command processing module 1012*b*. As a result, when the WWW browser 24*a* receives the file specified by the "get" command, the WWW browser 24*a* does not store the file in the cache 24*b*.

On the other hand, the CPU 11 determined that the specified file has been neither created nor acquired (S414: No), in S713 the CPU 11 sends, as a reply, an HTTP error code to the PC 20. The CPU 11 finishes executing the get-command processing module 1012*b*. Thus, the WWW browser 24*a* can notify the user of the PC 20 that the file specified by the "get" command does not exist.

Referring next to FIG. 8, a description is given for the flow of an index file creating process that is performed while executing the index file-creation processing module 1012*c* according to the second embodiment. The same steps as the first embodiment have the same reference numerals, and their detailed description is omitted here.

In this process, the steps S500-S505, S507, S509, and S510 are the same in the process that is performed in the index file-creation processing module 12*c* according to the first embodiment (see FIG. 5). After S505, in S801 the CPU 11 obtains a new path by adding the character string "/_index.html" to the end of path of each subdirectory existing in the specified directory. The CPU 11 newly sets each new path as the path of the corresponding subdirectory. That is, the CPU 11 replaces the path of each subdirectory with the path of the index file existing (or, practically, is treated as existing) in the subdirectory. After S801, the CPU proceeds to S507.

After S507, in S802 the CPU 11 associates each name of the files and the subdirectories existing in the specified directory, with the corresponding path obtained in steps S505-S801. The CPU 11 also associates each file name with the corresponding thumbnail if a thumbnail has been created for the file. The CPU 11 stores the association between the names of the subdirectories and the corresponding paths, the association between the names of files and the corresponding paths, and the association between the names of the files and the corresponding paths of the thumbnails in the file/directory storage area 13*a*. The CPU 11 proceeds to S509.

If the CPU 11 determines that the determination of S504 has been completed for all the subdirectories in the parent directory (S509: Yes), in S803 the CPU 11 creates an index file based on the information stored in the file/directory storage area 13*a*. Specifically, in S803 the CPU 11 sets a direct link to the index file of the subdirectory associating with the corresponding subdirectory name in the file/directory storage area 13*a*. The CPU 11 also sets a direct to the file in associating with the corresponding file name stored in the file/directory storage area 13*a*. The CPU 11 also associates the file name with the corresponding thumbnail if the thumbnail has been created for the file in S507. The CPU 11 stores the created index file in the index file storage area 13*c*, and then ends the index file-creation processing module 1012*c*.

When the user clicks a file name or subdirectory name by using the mouse 27 from the index file displayed by the WWW browser 24*a*, the WWW browser 24*a* sends a command to transfer the index file of the corresponding file or subdirectory, to the card reader 10, without reading a dummy file. The user can access a target file or subdirectory quickly.

Referring FIG. 9, an operational sequence of the file transfer system 1 according to the second embodiment is described. FIG. 9 is a sequence chart showing an operational sequence of the file transfer system 1 according to the second embodiment. The steps same as the first embodiment have the same reference numerals, and their detailed description is omitted here.

As shown in FIG. 9, in the file transfer system 1 according to the second embodiment, in S901 the user 70 of the PC 20 selects the memory-card access request file 24c provided on the desktop environment displayed on the screen. Subsequently, the CPU 21 starts the WWW browser 24a and notifies the WWW browser 24a that the memory-card access request file 24c has been selected.

In S902, in order to access the index file "_index.html" of the root directory within the memory card 18, the WWW browser 24a sends a command to transfer the "_index.html", to the cache 24b in accordance with the contents of the memory-card access request file 24c.

However, since the "_index.html" does not exist in the cache 24b because of a reason described later, in S903 the cache 24b notifies WWW browser 24a that transferring the "_index.html" is impossible.

Steps S605-S608 are performed in the same manner as in the file transfer system 1 according to the first embodiment. However, in S607, since the card reader 10 also sends, to the WWW browser 24a, a command written in the header field of the HTTP that instructs the WWW browser 24a not to cache the file, the WWW browser 24a does not save the received "_index.html" in the cache 24b. When the WWW browser 24a accesses the "_index.html", the "_index.html" does not exist in the cache 24b. Thus, the WWW browser 24a always sends a command ("get" command) to transfer the "_index.html", to the card reader 10. Accordingly, the WWW browser 24a can receive the latest "_index.html" from the card reader 10.

The steps S610, S617-S619, S621, and S625-S628 are also performed in the same manner as in the file transfer system 1 according to the first embodiment. However, in S618 and S627, since the card reader 10 also sends, to the WWW browser 24a, a command described in the header field of the HTTP, that instructs the WWW browser 24a not to cache the file specified by the HTTP header field. The WWW browser 24a saves neither the received file "_temp.txt" nor the index file "Photo/_index.html", in the cache 24b. Thus, when in S904 the WWW browser 24a access the text file "temp.txt", the WWW browser 24a sends a command to transfer the "temp.txt" from the cache 24b. Thus, in S905 the cache 24b certainly notifies the WWW browser 24a that transferring the "temp.txt" is impossible. Accordingly, in S617, the WWW browser 24a always sends a command ("get" command) to transfer the "temp.txt", to the card reader 10.

Similarly, when in S906 the WWW browser 24a accesses the "Photo/_index.html", the WWW browser 24a sends a command to transfer the "Photo/_index.html", from the cache 24b. Thus, in S907 the cache 24b certainly notifies the WWW browser 24a that transferring the "Photo/_index.html" is impossible. Accordingly, in S625 the WWW browser 24a always sends a command ("get" command) to transfer the "Photo/_index.html", to the card reader 10. Thus, the WWW browser 24a can receive the latest "temp.txt" and the latest "Photo/_index.html" from the card reader 10.

As described above, in the file transfer system 1 according to the second embodiment, when the card reader 10 sends a file to the WWW browser 24a of the PC 20, the card reader 10 also sends, to the WWW browser 24a, a command described in the HTTP header field that instructs the WWW browser 24a not to cache the file. As a result, when the WWW browser 24a repeatedly accesses the files stored in the card reader 18, the files are not stored in the cache 24b. Accordingly, the PC 10 can directly access the file stored in the memory card 18. Thus, the PC 20 can access each file in the latest state stored in the memory card 18.

Third Embodiment

Referring next to FIG. 10 to FIG. 13, the file transfer system 1 according to a third embodiment is described. In the file transfer system 1 according to the first embodiment, the card reader 10 creates dummy files 18a for all the files and the subdirectories in a prescribed directory, and for all the files in each subdirectory existing in the prescribed directory. Further, the card reader 10 creates the index file by setting links to the corresponding dummy files 18a for all the file names and subdirectory names.

On the other hand, in the file transfer system 1 according to the third embodiment, the card reader 10 acquires date-hour-minute-second Y from the timer circuit 16. Here, the date-hour-minute-second Y includes data of date, hour, minute, and second when an index file is created. The card reader 10, to create new paths, adds a character string "_tempY" to each path of files and each path of index files that is stored in subdirectories. Here, the character string "_tempY" includes the date-hour-minute-second Y. The card reader 10 creates an index file in which each name of files and subdirectories has a link to the corresponding new path.

FIG. 10 is a block diagram showing an electrical configuration of a file transfer system 1 according to the third embodiment of the invention. The elements described in the first embodiment are assigned with the same reference numerals, and their detailed description is omitted here.

In the card reader 10 according to the third embodiment, the ROM 12 stores a get-command processing module 12d and an index file-creation processing module 12e, instead of the get-command processing module 12b and the index file-creation processing module 12c according to the first embodiment.

The get-command processing module 12d is a program which controls the CPU 11 to execute the process in response to an FTP "get" command. Similarly to the get-command processing module 12b according to the first embodiment, the get-command processing module 12d works with the FTP server program 12a. As the CPU 11 receives a "get" command from the PC 20 during the execution of the FTP server program 12a, the CPU 11 starts executing the get-command processing module 12d. After returning the file specified by the "get" command or returning an "NG" code to the PC 20, the CPU 11 finishes the execution of the module.

The get-command processing module 12d according to the third embodiment is different from the get-command processing module 12b according to the first embodiment in the following points. First, if the name of the file specified by the "get" command ends in "_index_tempN.html" (N is an arbitrary value), the CPU 11 determines that the specified file is an index file. Otherwise, if the name of the file specified by the "get" command does not end in "_index_tempN.html", the CPU 11 determines that the specified file is a file stored in the memory card 18. Thus, even when the character string "_tempN.html" including the date, hour, minute, and second is added to the path name of the index file, the CPU 11 can recognize that the path name designates the index file.

If the file specified by the "get" command is an index file, the CPU 11 starts executing an index file-creation processing module 12e according to the third embodiment, to be described later. Furthermore, if the file specified by the "get" command is not an index file, and at the same time, if the path of the specified file includes the character string "_tempN" including the date, hour, minute, and second, the CPU 11 deletes the character string "_tempN" including the date, hour, minute, and second, from the path of the specified file name, and then recognizes this modified path as a correct path of the specified file. Accordingly, the user can access a target file correctly even when the index file has a link, to a file, having the path obtained by adding the character string including the date, hour, minute, and second.

Similarly to the index file-creation processing module 12c according to the first embodiment, the index file-creation processing module 12e is a program which controls the CPU 11 to create an index file. The index file-creation processing module 12e works with the get-command processing module 12d according to the third embodiment. As the CPU 11 receives a "get" command from the PC 20 during the execution of the get-command processing module 12d according to third embodiment, the CPU 11 starts executing the index file-creation processing module 12e. After storing the created index file in the index file storage area 13c, the CPU 11 finishes the execution of the index file-creation processing module 12e.

The index file-creation processing module 12e according to the third embodiment is different from the index file-creation module 12c according to the first embodiment in the following points. First, the index file-creation processing module 12e acquires, from the timer circuit 16, the date-hour-minute-second Y including date, hour, minute, and second when an index file is created, and then stores the date-hour-minute-second Y in a date-hour-minute-second variable 13d in the RAM 13 (described below) Next, the CPU 11 creates a new path by adding a character string "_tempY", which includes the date-hour-minute-second Y, to the name in the path for each file stored in the prescribed directory or the subdirectories existing in the prescribed directory. The CPU 11 sets each new path as the path of the corresponding file stored in the prescribed directory or the subdirectories existing in the prescribed directory. In other words, the path of file is modified to the new path of file in which the file name is inserted to the character string including the date-hour-minute-second Y. Further, the CPU 11 creates a new path of the subdirectory by adding "_index_tempY.html" to the end of the path for each subdirectory. The CPU 11 sets each new path as the path of the corresponding subdirectory. In other words, the path of subdirectory is modified to the new path of subdirectory that is inserted to the character string including the date-hour-minute-second Y. The CPU 11 creates an index file having a link to the file and subdirectory specified by the respective new paths, for each file and subdirectory.

Since no dummy file is required in the third embodiment, the memory card 18 does not have an area for saving a dummy file.

The RAM 13 includes the date-hour-minute-second variable 13d. The date-hour-minute-second variable 13d is used when the CPU 11 executes the index file-creation processing module 12e. The date-hour-minute-second variable 13d is a memory area for storing the date-hour-minute-second Y to be acquired from the timer circuit 16 every time an index file is created. The date-hour-minute-second Y stored in the date-hour-minute-second variable 13d is used when the character string "_tempY" including the date-hour-minute-second Y is added to each path of the files and subdirectories. The date-hour-minute-second variable 13d is released when the CPU 11 finishes the execution of the index file-creation processing module 12e.

In PC 20, the RAM 23 includes a date-hour-minute-second variable 23a. The date-hour-minute-second variable 23a is used when the CPU 21 executes a memory-card access request file 24d to be described later. The date-hour-minute-second variable 23a is a memory area for storing date-hour-minute-second X to be acquired from the timer circuit 29 every time the CPU 21 executes the memory-card access request file 24d. The date-hour-minute-second X includes date, hour, minute, second when the CPU 21 executes the memory-card access request file 24d. The date-hour-minute-second X stored in the date-hour-minute-second variable 23a is used when a character string "_tempX" including the date-hour-minute-second X is added to the path of the index file of the root directory in the memory card 18. The date-hour-minute-second variable 23a is released when the CPU 21 finishes the execution of the memory-card access request file 24d.

The hard disk drive 24 stores the memory-card access request file 24d, instead of the memory-card access request file 24c according to the first embodiment. The memory-card access request file 24d is executed by the CPU 21. The memory-card access request file 24d contains instruction information to instruct the WWW browser 24a to access the index file of the root directory in the memory card 18 via FTP.

The memory-card access request file 24d is displayed on the OS desktop environment so that the user can select the memory-card access request file 24d by using the keyboard 26 or the mouse 27. When the user selects the memory-card access request file 24d, the CPU 21 acquires the current date-hour-minute-second, as the date-hour-minute-second X, from the timer circuit 29, and then adds the character string "_tempX" including the acquired date, hour, minute, and second, to the path name of the index file for the root directory in the memory card 18. The CPU 21 starts the WWW browser 24a to send an FTP command ("get" command) instructing to transfer the file specified by the path obtained by adding the character string "tempX".

Referring next to FIG. 11(*a*), a description is given for the flow of a memory card access process that is performed when the memory-card access request file 24d is clicked according to the third embodiment. FIG. 11(*a*) is a flowchart showing the memory card access process. When the user selects the memory-card access request file 24d by using the keyboard 26 or the mouse 27, the CPU 21 starts the memory-card access request file 24d.

As shown in FIG. 11(*a*), in S1101, the CPU 21 acquires the current date, hour, minute, and second, as date-hour-minute-second X, from the timer circuit 29, and then stores the current date-hour-minute-second X in the date-hour-minute-second variable 23a. In S1102, the CPU 21 specifies the URL (Uniform Resource Locator) "ftp: //aaa/_index_tempX.html", and then starts the WWW browser 24a. Specifically, the CPU 21 adds the character string "_tempX" including the date-hour-minute-second X stored in the date-hour-minute-second variable 23a, to the path name "//aaa/_index.html" of the index file for the root directory in the memory card 18. Accordingly, the CPU 21 obtains the path "//aaa/_index_tempX.html". The CPU 21 instructs the WWW browser 24a to send an FTP command ("get" command) instructing to transfer the file specified by the path "//aaa/_index_tempX.html" to which the character string has been added.

As a result, the WWW browser 24a sends, to the card reader 10, a command instructing to transfer the index file "//aaa/_index_tempX.html" of the root directory in the memory card 18, via FTP. In this case, the date-hour-minute-second X is acquired from the timer circuit 29 every time the memory-card access request file 24d is executed. Thus, the date-hour-minute-second X varies each time the date-hour-minute-second X is acquired. The WWW browser 24a recognizes that a command instructing to transfer a different file is sent to the card reader 10 each time the command is sent. That is, the WWW browser 24a recognizes that the currently specified file by the command to transfer differs from other files previously specified by the command. Thus, even when the WWW browser 24a accesses the index file of the root directory repeatedly, the data in the cache 24b is not referred by the WWW browser 24a.

Referring next to FIG. 11(*b*), a description is given for the flow of a get command process that is performed while executing the get-command processing module 12d by the CPU 11 according to the third embodiment. The same steps in the get-command processing module 12b according to the first embodiment have the same reference numerals, and their detailed description is omitted here.

In S1110, the CPU 11 determines whether or not the name of the file specified by the "get" command ends in "_index_tempN.html" (N is an arbitrary value). If the name ends in "_index_tempN.html" (S1110: Yes), the CPU 11 determines that the specified file is an index file and proceeds to S1113. In S1113, the CPU 11 executes an index file-creation processing module 12e to be described later. Accordingly, even when the character string "_tempN" including the date, hour, minute, and second has been added to the path name of the index file, the CPU 11 can recognize that the path designates the index file and can create the index file. After S1113, the CPU 11 proceeds to S414. The steps S413-S416 are performed in the same manner as in the get-command processing module 12b (see FIG. 4(*b*)) according to the first embodiment.

On the other hand, if the CPU 11 determines that the name does not end in "_index_tempN.html" (S1110: No), the CPU 11 determines that the specified file is a file stored in the memory card 18, and then proceeds to S1111.

In S1111, the CPU 11 determines whether or not the path of the specified file includes the character string "_tempN" (N is an arbitrary number) having a date-hour-minute-second N. Here, the date-hour-minute-second N includes a date, hour, minute, and second. If the character string "_tempN" is included in the path of the specified file (S1111: Yes), the CPU 11 deletes the character string "_tempN" from the path of the specified file. In S1112, the CPU 11 recognizes this modified path as a correct path of the specified file, and then proceeds to S413. As a result, even when the character string "_tempN" has been added to the path name of the specified file, the CPU 11 can acquire the correct path of the specified file.

On the other hand, if the path of the specified file does not include the character string "_tempN" having the date-hour-minute-second N (S1111: No), the CPU 11 then proceeds to S413. Accordingly, the CPU 11 can acquire the file specified by the "get" command from the memory card 18.

Referring next to FIG. 12, a description is given for the flow of an index file creating process that is performed while executing the index file-creation processing module 12e by the CPU 11 according to the third embodiment. The same steps in the get-command processing module 12c according to the first embodiment have the same reference numerals, and their detailed description is omitted here.

The steps S500-S505, S507, S509, and S510 are performed in the same manner as in the get-command processing module 12c according to the first embodiment (see FIG. 5). After S505, in S1201, the CPU 11 acquires the current date-hour-minute-second, as the date-hour-minute-second Y, from the timer circuit 16 and then stores the current Y in the date-hour-minute-second variable 13d. In S1202 the CPU 11 inserts "_tempY" to the file name included in the path for each of the files in the specified directory. In S1203 the CPU 11 adds a character string "_index_tempY.html" to the end of the subdirectory for each of subdirectories in the specified directory. Subsequently, the CPU 11 sets the path with "_index_tempY.html" as a new path of the subdirectory. In other words, the path of the subdirectory is modified to the new path in which the character string "_index_tempY.html" including date-hour-minute-second Y.

After S1203, the CPU proceeds to S507. After S507, in S1204 the CPU 11 associates each name of the subdirectories existing in the specified directory, with the newly created path of the corresponding subdirectory. The CPU 11 also associates each name of the files in the specified directory, with the newly created path of the corresponding file. Further, the CPU 11 associates each file name in the specified directory with the corresponding thumbnail if any thumbnail has been created for the file. The CPU 11 stores the association between the subdirectory name and the newly created path, association between the file name and the newly created path and the thumbnail in the file/directory storage area 13a. The CPU proceeds to S509.

In S509, the CPU 11 determines that the determination with respect to the existence of the file and the subdirectory has been completed for all the subdirectories existing in the parent directory (S509: Yes), in S1205 the CPU 11 creates an index file based on the information stored in the file/directory storage area 13a. Specifically, in S1205 the CPU 11 creates the index file by setting a link to the subdirectory by the newly created path associating with the corresponding subdirectory name in the file/directory storage area 13a. The CPU 11 also sets, in the index file, a link to the file by the newly created path associating with the corresponding file name in the file/directory storage area 13a. Further, the CPU 11 associates the file name in the file/directory storage area 13a with the corresponding thumbnail if any thumbnail has been created for the file. The CPU 11 stores the created index file in the index file storage area 13c, and then stop executing the index file-creation processing module 12c.

As described above, the date-hour-minute-second Y is acquired from the timer circuit 16 every time the CPU 11 prepares data required by the specified directory for creating the index file. Accordingly, the date-hour-minute-second Y varies each time the date-hour-minute-second Y is acquired. Thus, the linked path set in each file or each subdirectory varies every time an index file is created. In other words, if a plurality of index files has been created in different timings for one subdirectory, a path of file or subdirectory in this index file is different from a corresponding path of file or subdirectory in another index file. Thus, if the user selects, by using the WWW browser 24a, a file or subdirectory described in a current index file, the path linked to the selected file or directory is different from a path described in another index file that has previously created. Accordingly, the WWW browser 24a does not refer to the cache 24b.

Figure 13:
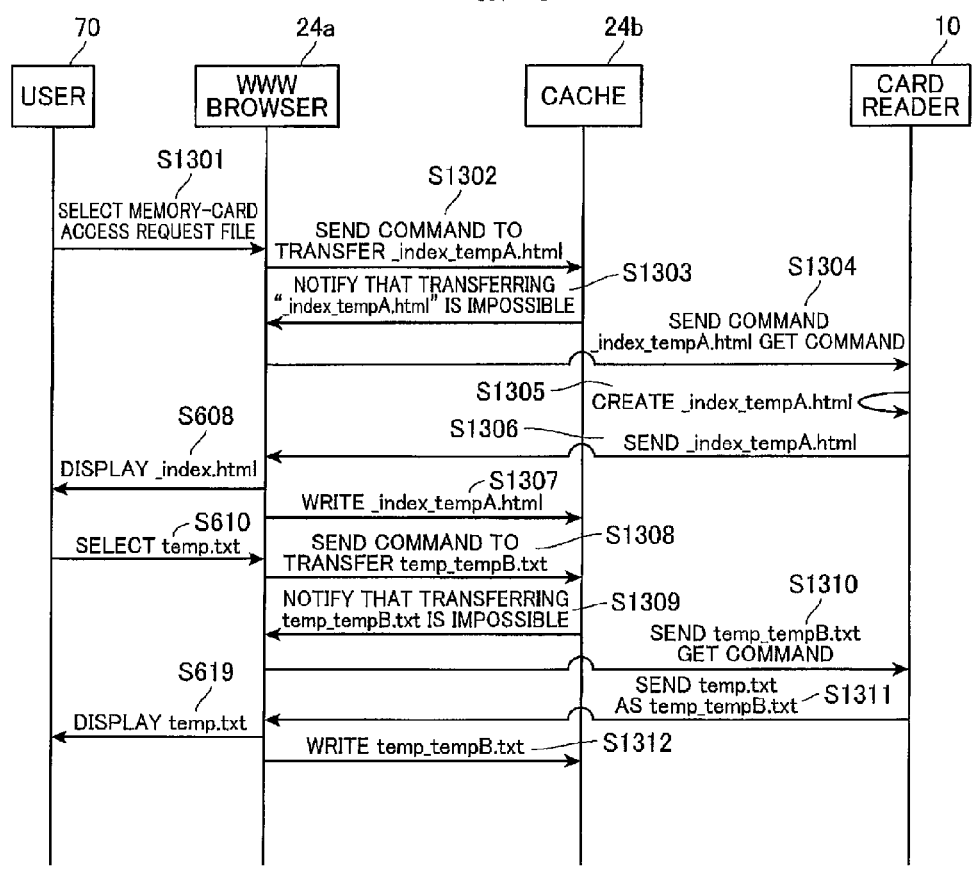
FIG. 13 is a sequence chart showing an operational sequence of the file transfer system according to the third embodiment.

Referring to FIG. 13, an operation of the file transfer system 1 according to the third embodiment is described. FIG. 13 is a sequence chart showing an operational sequence of the file transfer system 1 according to the third embodiment. The same steps as the first embodiment have the same reference numerals, and their detailed description is omitted here.

As shown in FIG. 13, in the file transfer system 1 according to the third embodiment, when in S1301 the user 70 of the PC 20 selects the memory-card access request file 24c provided on the desktop environment displayed on the screen, the CPU 21 acquires, from the timer circuit 29, a current date, hour, minute, and second, as a date-hour-minute-second A. At the same time, the CPU 21 starts the WWW browser 24a and requests the WWW browser 24a to send a command ("get" command) instructing to transfer the index file "_index_tempA.html" of the root directory in the memory card 18 via FTP.

In response to this, in S1302 the WWW browser 24a sends, to the cache 24b, a command instructing to transfer an index file "_index_tempA.html". However, since the path of the index file includes the date-hour-minute-second A, the file having the same path does not exist in the cache 24b. Thus, in S1303, the cache 24b notifies WWW browser 24a that transferring the "_index_tempA.html" is impossible. In S1304, the WWW browser 24a sends, to the card reader 10a, a command ("get" command) to transfer the "_index_tempA.html". Thus, even when the index file for the root directory has been stored in the cache 24b, the files in the cache 24b never be used. Accordingly, the card reader 10 can create an index file in the latest state.

In S1305, the card reader 10 detects the file and the subdirectory existing in the root directory by using the index file-creation processing module 12e and creates the "_index_tempA.html". In S1306, the card reader 10 returns the created "_index_tempA.html" to the WWW browser 24a. In S608, similarly to the first embodiment, the WWW browser 24a displays the received index file of the root directory to the user 70. In S1307, the "_index_tempA.html" displayed by the WWW browser 24a is written in the cache 24b. However, as described above, since the path of the index file indicating the root directory varies depending on date, hour, minute, and second every time the memory-card access request file is selected. The "_index_tempA.html" written in the cache 24b is no longer read.

In S610, the user 70 selects the file name "temp.txt" from the index file displayed by the WWW browser 24a. In S1308, the WWW browser 24a sends a command to transfer the file "temp_tempB.txt", to the cache 24b, based on the link "temp_tempB.txt" set to the file name "temp.txt" in the index file. In this case, the character string "tempB" includes a date-hour-minute-second B. Here, a date-hour-minute-second B includes the date, hour, minute, and second that is acquired from the timer circuit 16 when the card reader 10 creates an index file in S1305. The character string "tempB" varies every time an index file is created. Thus, the "temp_tempB.txt" does not exist in the cache 24b. Subsequently, in S1309 the cache 24b notifies the WWW browser 24a that transferring the "temp_tempB.txt" is impossible. In response, in S1310 the WWW browser 24a sends a command ("get" command) to transfer the "temp_tempB.txt" to the card reader 10.

In S1311, the card reader 10 acquires the "temp.txt" stored in the memory card 18 by using the get-command processing module 12d, and then transfers the "temp.txt" to the WWW browser 24a as a "temp_tempB.txt". In S619, similarly to the first embodiment, the WWW browser 24a displays the received "temp_temp.txt" to the user 70. As a result, the "temp.txt" in the latest state is completely read from the card reader 10. In S619, the WWW browser 24a writes the received "temp.txt" as a "temp_tempB.txt" in the cache 24b.

However, as described above, since the character string "tempB" included in the "temp_tempB.txt" varies every time an index file is created, the "temp_tempB.html" written in the cache 24b is no longer read after creating a new index file.

The operation to be performed when the user 70 selects the subdirectory name "Photo" from the index file displayed by the WWW browser 24a, is the same as in the operation to be performed when the file name "temp.txt" is selected (steps S610, S1308-S1311, S619, and S1312), except that the subdirectory name "Photo" has a link to the index file "Photo/_index_tempB.html" (B means date, hour, minute, and second). Thus, the drawings and detailed description thereof are omitted here.

As described above, in the file transfer system 1 according to the third embodiment, the card reader 10 acquires the date-hour-minute-second Y when an index file is created, from the timer circuit 16. The character string "_tempY" (Y means a date, hour, minute, and second) including the date, hour, minute, and second is added to each path of files and the index files existing in the subdirectory, thereby creating a new path for the corresponding file or index file. The link to the file or the index file for the subdirectory specified by the newly created path is set for all the file names and subdirectory names.

If the index file of a prescribed directory is created repeatedly, a path in one index file is associated with a file or a subdirectory that is different from a path, in another file, associated with the same file or the same directory because of the date-hour-minute-second Y acquired every time the index file is created for the prescribed directory. Thus, even if the plurality of index files includes the same file or directory, the WWW browser 24a can recognize that a path of a file or a subdirectory in the current index file is different from a path, in a index file that is previously created, of the same file or subdirectory. If the user selects, by using the WWW browser 24a, a file or a subdirectory in the current index file that is the same file or the same directory in the index file that has been previously created, the data saved in the cache for the file or the subdirectory is no longer referred.

On the other hand, if the character string "_tempN" including the date, hour, minute, and second (N is an arbitrary number) is added to the path of the file specified by the transfer command from the WWW browser 24a, the card reader 10 deletes the character string "_tempN" from the path, and then recognizes, as a correct path, the path from which the character string "_tempN" is deleted. As a result, the card reader 10 sends the file specified by the correct path to the PC 20 so that the file targeted by the user can be sent to the PC 20 correctly. This allows the PC 20 to access each file in the latest state correctly.

While the invention has been described in detail with reference to the above embodiments thereof, it would be apparent to those skilled in the art that various changes and modifications may be made therein without departing from the spirit of the invention.

For example, in the above described embodiments, each subdirectory name has a direct or indirect link via the dummy file to the index file existing (or, practically, is treated as existing) in the subdirectory. However, each subdirectory name may have a link to an arbitrary file existing in the subdirectory or a link to the subdirectory itself. In this case, when the card reader 10 receives a transfer command ("get" command) to specify the subdirectory, the card reader 10 creates and transfers an index file of the subdirectory, or the card reader 10 transfers the arbitrary file existing in the subdirectory.

In the above described embodiments, when the card reader 10 receives a command to transfer the index file of a prescribed directory, the card reader 10 creates an index file for the prescribed directory. However, if a new file or subdirectory is created in a prescribed directory in the memory card 18 or if any file or subdirectory is deleted from the prescribed directory, the card reader 10 may create an index file for the prescribed directory and then stores the created index file in a prescribed place. As a result, when the card reader 10 receives an index file transfer command, the index file is affected by each of files and subdirectories currently existing in the prescribed directory. The card reader 10 allows the WWW browser 24a of the PC 20 to display the latest information of each file and each subdirectory stored in the memory card 18.

For each subdirectory in the prescribed directory, the CPU 11 may acquires a size of a subdirectory, a number of files in the subdirectory, and a number of subdirectories in the subdirectories. The CPU 11 creates an index file by associating each name of the subdirectories with the acquired size of the subdirectory, the acquired numbers of the files in the subdirectory, and the number of the subdirectories existing in the subdirectory. The browser 24a can display these association based on this index file. Accordingly, the user can estimate the content of the files in the subdirectory by this association between the subdirectory name and the size of the subdirectory, the number of the files, and the number of the subdirectories existing in the subdirectory.

In the above embodiments, an index file is created so that both file name and thumbnail are displayed if the thumbnail is created for the file. However, if a thumbnail is crated for a file, an index file only displays the created thumbnail without displaying the name of the file. Alternatively, only the file name can be displayed without displaying the thumbnail.

The index file created in the above embodiments lists all the files and the subdirectories in the prescribed directory and all the files and the subdirectories in each subdirectory existing in the prescribed directory. That is, the index file firstly lists each name of files in the prescribed directory and each name of subdirectories that is immediately lower in level of the hierarchy structure than the prescribed directory. The index file also lists all the name of the files in each firstly listed subdirectory and all the name of the subdirectories that is immediately lower in level of the hierarchy structure than the firstly listed subdirectories. However, the index file may list all the files and subdirectories contained in a prescribed directory. That is, the card reader 10 searches, from the prescribed directory, all the files and subdirectories that are lower in level of the hierarchy structure than the prescribed directory. In other words, the card reader 10 searches all the files and directories from the prescribed directory to the lowest hierarchy level. The index file lists all the detected subdirectories and files contained in the prescribed directory. Accordingly, the user can confirm all the subdirectories and files that are contained in the prescribed directory by the single index file.

Alternatively, the index file may list all the files and subdirectories existing in a prescribed directory and existing in subdirectories contained in the prescribed directory for a prescribed hierarchy levels. That is, the card reader 10 searches, from the prescribed directory, all the files and subdirectories that are lower in level of the hierarchy structure than the prescribed directory by a prescribed amount of hierarchy levels. In other words, the card reader 10 searches all the files and subdirectories from the prescribed directory to the prescribed amount of hierarchy levels. In this case, the index file can be created in a shorter time in comparison with the case in which the index file lists all the files and subdirectories contained in the prescribed directory.

In the first embodiment, the dummy file is stored in the memory card 18. However, the dummy file can be stored in the RAM 13 or another memory device.

In the third embodiment, the character string including the date, hour, minute, and second acquired from the timer circuit 16 is added to the path of the file in the prescribed directory or the subdirectory existing in the prescribed directory, and is added to the index file for the subdirectory every time an index file is created. However, another type of information that varies every time an index file is created can be added thereto. For example, a counter which is incremented every time an index file is created, can be provided so that the character string including the incremented number is added to the path of each file and to the path of the index file of each subdirectory.

In the first and third embodiments, data is transferred between the card reader 10 and the PC 20 via FTP. However, HTTP can be employed for the data therebetween. In this case, the FTP server program 12a is replaced with an HTTP server program 1012a. The flow of the process of the HTTP server program 1012a can use the same as in the FTP server program 12a shown in FIG. 4(a).

In the above embodiments, the card reader 10 and the PC 20 are connected on the LAN. However, the card reader 10 and the PC 20 can be connected via the Internet.

In the above embodiments, the memory card 18 is employed as file storage. However, any device is applicable such as a hard disk drive, a CD (Compact Disc), or a DVD (Digital Versatile Disc), as long as the device can store files. The server device is not limited to the card reader 10. Any device is applicable as long as the device includes the file storage.

What is claimed is:

1. A server device configured to communicate with a client device via a network, the server device comprising:
   a storing unit configured to stores a file in a directory that constructs a hierarchy structure;
   a receiving unit configured to receives a command from the client device; and
   a processor comprising hardware, the processor being configured to:
   generate a first index file with respect to the directory and a second index file with respect to a first subdirectory of the directory, the first index file lists name of all the files existing in the directory and name of the first subdirectory, both the first index file and the second index file are in a hypertext format;
   generate a first dummy file and a second dummy file, both being in a hypertext format, the first dummy file including first information to access directly to the file in the directory and a path of the file in the directory, and the second dummy file including second information to access to the first subdirectory of the directory and a path of the second index file, first dummy file including a first redirect command to redirect to the file in the directory and a file name of the file in the directory, the second dummy file including a second redirect command to redirect to the second index file and a file name of the second index file, the first index file links to the first dummy file and the second dummy file by including a list of third information that identifies the file and a path of the first dummy file including the first information to access directly to the file in the directory and the part of the file in the directory, the second dummy file including a list of fourth information that identifies the first subdirectory and a path of the second index file including the second information to access to the first subdirectory of the directory and the part of the first subdirectory;
   store the first dummy file including the first information to access directly to the file in the directory and the path of the file in the directory and the second dummy file including the second information to access to the first subdirectory of the directory and the path of the first subdirectory;
   transfer the first index file to the client device in response to the command received at the receiving unit instructing to transfer the first index file;

transfer the second index file to the client device in response to the command received at the receiving unit instructing to transfer the second index file caused by the second redirect command included in the second dummy file identified by the fourth information included in the second index file; and transfer the file stored in the storing unit in response to the command received at the receiving unit instructing to transfer the file caused by the first redirect command included in the first dummy file identified by the third information included in the first index file.

2. The server device according to claim 1, wherein the processor updates the first index file whenever at least one of the file and the first subdirectory in the directory is created in or deleted from the directory.

3. The server device according to claim 1, wherein the process generates a third index file includes a list of fifth information that identifies a subdirectory file in the first subdirectory, the list further including a second subdirectory that is immediately lower in level of the hierarchy structure than the first subdirectory.

4. The server device according to claim 3, wherein the processor is configured to generate a third dummy file in the hypertext format, the third dummy file including sixth information to access to the second subdirectory, the second index file including a path of the third dummy file and a path of the fourth dummy file.

5. The server device according to claim 3, wherein the processor acquires, as first subdirectory information, a size of the first subdirectory, a number of second subdirectories in the first subdirectory, and a number of files in the first subdirectory and the number of files in the second subdirectory, wherein the processor generates the first index file associating the third information with the first subdirectory information.

6. The server device according to claim 1, wherein the third information of the file in the list is associated with the path of the first dummy file, and the third information of the first subdirectory in the list is associated with the path of the second dummy file, wherein the processor transfers one of the first dummy file and the second dummy file to the client device if the command received at the receiving unit instructs to transfer the one of the first dummy file and the second dummy file.

7. The server device according to claim 1, wherein the processor generates a third index file including fifth information that identifies a subdirectory file in the first subdirectory and a plurality of subdirectories that is lower in level of the hierarchy structure than the first subdirectory.

8. The server device according to claim 1, wherein the processor generates a thumbnail of the file stored in the storing unit if the file is one selected from a group consisting of an image file, a document file, and a drawing file, wherein the processor generates the first index file and the second index file using the thumbnail.

9. A file transfer system comprising:
a server device; and
a client device,
wherein the server device is configured to communicate with the client device via a network, and the server device comprises:
a storing unit configured to stores a file in a directory that constructs a hierarchy structure;
a receiving unit configured to receives a first command, a second command, and a third command from the client device; and a processor comprising hardware, the processor being configured to:
generate a first index file with respect to the directory and a second index file with respect to a first subdirectory of the directory, the first index file lists name of all the files existing in the directory and name of the first subdirectory, both the first index file and the second index file are in hypertext format;
generate a first dummy file and a second dummy file, both being in a hypertext format, the first dummy file including first information to access directly to the file in the directory and a path of the file in the directory, and the second dummy file including second information to access to the first subdirectory of the directory and a path of the second index file, the first dummy file including a first redirect command to redirect to the file in the directory and a file name of the file in the directory, the second dummy file including a second redirect command to redirect to the second index file and a file name of the second index file, the first index file links to the first dummy file and the second dummy file by including a list of third information that identifies the file and a path of the first dummy file including the first information to access directly to the file in the directory and the part of the file in the directory, the second dummy file including a list of fourth information that identifies the first subdirectory and a path of the second index file including the second information to access to the first subdirectory of the directory and the part of the first subdirectory;
store the first dummy file including the first information to access directly to the file in the directory and the path of the file in the directory and the second dummy file including the second information to access to the first subdirectory of the directory and the path of the first subdirectory;
transfer the first index file to the client device in response to the first command received at the receiving unit instructing to transfer the first index file,
transfer the second index file to the client device in response to the second command received at the receiving unit instructing to transfer the second index file; and
transfer the file stored in the storing unit in response to the third command received at the receiving unit instructing to transfer the file caused by the first redirect command included in the first dummy file identified by the third information included in the first index file;
wherein the client device comprises:
a browser that is configured to display a file generated in a hypertext format and to access the file stored in the storing unit via the first dummy file;
a first command transferring unit that transfers the first command to transfer the first index file;
a second command transferring unit that transfers the second command to transfer the second index file; and
a third command transferring unit that transfers the third command to transfer the file specified by the browser.

10. A method for controlling a server device that configured to communicate with a client device via a network, the server device including a storing unit that stores a file in a directory that constructs a hierarchy structure, the method comprising:
(a) receiving a command from the client device;
(b) generating a first index file with respect to the directory and a second index file with respect to a first subdirectory of the directory, the first index file lists name of all files existing in the directory and name of the first subdirectory, both the first index file and the second index file are in a hypertext format;

(c) generating a first dummy file and a second dummy file, both being in a hypertext format, the first dummy file including first information to access directly to the file in the directory and a path of the file in the directory, and the second dummy file including second information to access to the first subdirectory of the directory and a path of the second index file, the first dummy file including a first redirect command to redirect to the file in the directory and a file name of the file in the directory, the second dummy file including a second redirect command to redirect to the second index file and a file name of the second index file, the first index file links to the first dummy file and the second dummy file by including a list of third information that identifies the file and a path of the first dummy file including the first information to access directly to the file in the directory and the part of the file in the directory, the second dummy file including a list of fourth information that identifies the first subdirectory and a path of the second index file including the second information to access to the first subdirectory of the directory and the part of the first subdirectory;

(d) storing the first dummy file including the first information to access directly to the file in the directory and the path of the file in the directory and the second dummy file including the second information to access to the first subdirectory of the directory and the path of the first subdirectory;

(e) transferring the first index file to the client device in response to the command received at the receiving step (a) instructing to transfer the first index file;

(f) transferring the second index file to the client device in response to the command received a the receiving step (a) instructing to transfer the second index file; and (g) transferring the file stored in the server device in response to the command received at the receiving step (a) instructing to transfer the file caused by the first redirect command included in the first dummy file identified by the third information included in the first index file.

11. A non-transitory, computer-readable storage medium storing a set of program instructions executable on a server device that is configured to communicate with a client device via a network, the server device including a storing unit for storing a file in a directory that constructs a hierarchy structure, the program instructions comprising:

(a) receiving a command from the client device;

(b) generating a first index file with respect to the directory and a second index file with respect to a first subdirectory of the directory, the first index file lists name of all files existing in the directory and name of the first subdirectory, both the first index file and the second index file are in a hypertext format;

(c) generating a first dummy file and a second dummy file, both being in a hypertext format, the first dummy file including first information to access directly to the file in the directory and a path of the file in the directory, and the second dummy file including second information to access to the first subdirectory of the directory and a path of the second index file, the first dummy file including a first redirect command to redirect to the file in the directory and a file name of the file in the directory, the second dummy file including a second redirect command to redirect to the second index file and a file name of the second index file, the first index file links to the first dummy file and the second dummy file by including a list of third information that identifies the file and a path of the first dummy file including the first information to access directly to the file in the directory and the part of the file in the directory, the second dummy file including a list of fourth information that identifies the first subdirectory and a path of the second index file including the second information to access to the first subdirectory of the directory and the part of the first subdirectory;

(d) storing the first dummy file including the first information to access directly to the file in the directory and the path of the file in the directory and the second dummy file including the second information to access to the first subdirectory of the directory and the path of the first subdirectory;

(e) transferring the first index file to the client device in response to the command received at the receiving step (a) instructing to transfer the first index file;

(f) transferring the second index file to the client device in response to the command received a the receiving step (a) instructing to transfer the second index file caused by the second redirect command included in the second dummy file identified by the fourth information included in the second index file; and (g) transferring the file stored in the server device in response to the command received at the receiving step (a-1) instructing to transfer the file caused by the first redirect command included in the first dummy file identified by the third information included in the first index file.

* * * * *